(12) United States Patent
Stepanenko

(10) Patent No.: US 10,249,022 B2
(45) Date of Patent: Apr. 2, 2019

(54) SYSTEMS AND METHODS FOR DEWARPING IMAGES

(71) Applicant: Intelligent Security Systems Corporation, Woodbridge, NJ (US)

(72) Inventor: Oleg Vladimirovich Stepanenko, Balashikha (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 0 days.

(21) Appl. No.: 15/926,001

(22) Filed: Mar. 20, 2018

(65) Prior Publication Data
US 2018/0276792 A1 Sep. 27, 2018

Related U.S. Application Data

(63) Continuation of application No. 15/432,770, filed on Feb. 14, 2017, now Pat. No. 9,947,079, which is a (Continued)

(51) Int. Cl.
*G06K 9/00* (2006.01)
*G06T 3/40* (2006.01)
(Continued)

(52) U.S. Cl.
CPC ............ *G06T 3/4007* (2013.01); *B60R 1/00* (2013.01); *G06T 1/0007* (2013.01); *G06T 5/006* (2013.01);
(Continued)

(58) Field of Classification Search
CPC combination set(s) only.
See application file for complete search history.

(56) References Cited

U.S. PATENT DOCUMENTS 6,005,611 A 12/1999 Gullichsen et al.
6,687,387 B1 2/2004 Molnar et al.
(Continued)

FOREIGN PATENT DOCUMENTS

WO WO2015162067 10/2015

OTHER PUBLICATIONS

Scaramuzza, D., Martinelli, A. & Siegwart, R. (2006). A Flexible Technique for Accurate Omnidirectional Camera Calibration and Structure from Motion, Proceedings of IEEE International Conference on Computer Vision Systems, USA, Jan. 2006, New York, 9 pages.
(Continued)

*Primary Examiner* — Alex Kok S Liew
(74) *Attorney, Agent, or Firm* — Eric L. Sophir; Dentons US LLP

(57) ABSTRACT

A computer-implemented method comprises: extracting a setting from a description file of a virtual pan-tilt-zoom (PTZ) camera used to capture an original image through a wide-angle lens; determining a first set of coordinates of a pixel of the original image for each cell of a sparse conversion map represented as a first look-up table, wherein the sparse conversion map corresponds to a sparse grid of pixels of an output image; determining, via interpolating the first set of coordinates, a second set of coordinates of a pixel of the original image for each cell of a full conversion map, wherein the second set of coordinates is represented as a second look-up table, wherein the full conversion map corresponds to a full grid of pixels of the output image; instructing a display to present the output image, wherein the original image is less rectilinear than the output image.

20 Claims, 22 Drawing Sheets

Related U.S. Application Data continuation of application No. 15/241,572, filed on Aug. 19, 2016, now Pat. No. 9,609,197.

(51) Int. Cl.
    *G06T 1/00*      (2006.01)
    *H04N 5/217*      (2011.01)
    *H04N 5/232*      (2006.01)
    *B60R 1/00*      (2006.01)
    *G06T 5/00*      (2006.01)

(52) U.S. Cl.
    CPC ............ *H04N 5/217* (2013.01); *H04N 5/232* (2013.01); *H04N 5/23206* (2013.01); *H04N 5/23238* (2013.01); *H05K 999/99* (2013.01); *B60R 2300/30* (2013.01); *B60R 2300/80* (2013.01)

(56) References Cited

U.S. PATENT DOCUMENTS

| | | | |
|---|---|---|---|
| 7,511,734 | B2 | 3/2009 | Ozaki |
| 7,570,280 | B2 | 8/2009 | Ozaki |
| 7,683,929 | B2 | 3/2010 | Elazar et al. |
| 8,194,993 | B1 | 6/2012 | Chen et al. |
| 8,340,453 | B1 | 12/2012 | Chen et al. |
| 8,340,462 | B1 | 12/2012 | Gigushinski et al. |
| 8,391,640 | B1 | 3/2013 | Jin |
| 8,427,538 | B2 | 4/2013 | Ahiska |
| 8,670,001 | B2 | 3/2014 | Comer et al. |
| 9,547,883 | B1 | 1/2017 | Stepanenko |
| 2004/0061787 | A1 | 4/2004 | Liu et al. |
| 2004/0169724 | A1 | 9/2004 | Ekpar |
| 2005/0265619 | A1 | 12/2005 | Ozaki |
| 2006/0187305 | A1* | 8/2006 | Trivedi ............. G06K 9/00234 348/169 |
| 2007/0065014 | A1* | 3/2007 | Owechko ................ G06K 9/42 382/190 |
| 2007/0103543 | A1 | 5/2007 | Anderson et al. |
| 2008/0122922 | A1 | 5/2008 | Geng |
| 2008/0144968 | A1 | 6/2008 | Cohen et al. |
| 2009/0002363 | A1 | 1/2009 | Wu et al. |
| 2010/0201783 | A1 | 8/2010 | Ueda et al. |
| 2011/0032368 | A1 | 2/2011 | Pellling |
| 2011/0075916 | A1 | 3/2011 | Knothe et al. |
| 2011/0257985 | A1 | 10/2011 | Goldstein |
| 2013/0020476 | A1 | 1/2013 | Mercur'ev |
| 2014/0119653 | A1 | 5/2014 | Wu |
| 2015/0062292 | A1 | 3/2015 | Kweon |
| 2015/0213572 | A1 | 7/2015 | Loss |

OTHER PUBLICATIONS

Scaramuzza, D., Omnidirectional Camera Toolbox for Matlab. URL http://https://sites.goggle.com/site/scarabotix/ Dcamcalib-toolbox, May 2006, 39 pages.

* cited by examiner

700A

700B

700C

700D

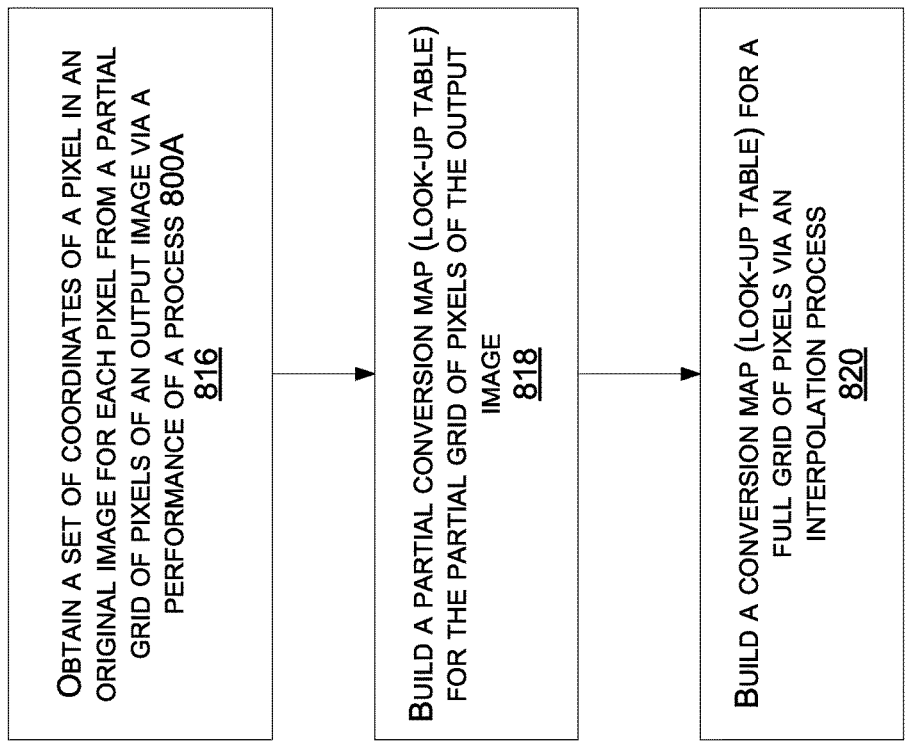

1000

SYSTEMS AND METHODS FOR DEWARPING IMAGES

CROSS-REFERENCE TO RELATED APPLICATIONS

This patent application is a continuation of U.S. patent application Ser. No. 15/432,770, filed on Feb. 14, 2017, which is a continuation of U.S. patent application Ser. No. 15/241,572, filed on Aug. 19, 2016, now U.S. Pat. No. 9,609,197, issued on Mar. 28, 2017, all of which are fully incorporated by reference herein for all purposes.

TECHNICAL FIELD

Generally, the present disclosure relates to processing images. More particularly, the present disclosure relates to dewarping images.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned with. Further, nothing is disclaimed.

An image is captured via an image capture device, such as a camera. The image capture device typically includes a lens, such as a wide-angle lens. For example, a camera with a wide-angle lens may have a magnitude of a viewing angle (horizontal or vertical) up to about 180 degrees. When a camera captures an image through a wide-angle lens, such as in a fish-eye lens camera, then the image is often round or distorted. Therefore, such image may be converted into a flat image through a dewarping process, whether native to the camera or remote from the camera. However, the dewarping process can introduce distortions into the flat image, which are undesired.

Additionally, many systems of video-observation and video-analysis put high demands on processing speed. For example, some of such systems process video in real-time at a rate of several tens of frames per second. However, correcting or removing one or more distortions introduced by the wide-angle lens can mandate large expenditures of computing resources. Such large expenditures are generally not desired.

Accordingly, there is a desire to provide various technologies to at least partially alleviate such drawbacks.

SUMMARY

The present disclosure at least partially addresses at least one of the above. However, the present disclosure can prove useful to other technical areas. Therefore, the claims should not be construed as necessarily limited to addressing any of the above.

In an embodiment, there is provided a method of image conversion, the method comprises: extracting, by a processor, a setting from a description file of a virtual pan-tilt-zoom (PTZ) camera used to capture an original image through a wide-angle lens; determining, by the processor, based on the extracting, a first set of coordinates of a pixel of the original image for each cell of a sparse conversion map represented as a first look-up table, wherein the sparse conversion map corresponds to a sparse grid of pixels of an output image; determining, by the processor, via interpolating the first set of coordinates, a second set of coordinates of a pixel of the original image for each cell of a full conversion map, wherein the second set of coordinates is represented as a second look-up table, wherein the full conversion map corresponds to a full grid of pixels of the output image; instructing, by the processor, based on the interpolating, a display to present the output image, wherein the original image is less rectilinear than the output image.

In an embodiment, there is provided a system comprising: a server storing a set of instructions instructive for a processor to perform an image conversion based at least in part on: extracting, by the processor, a plurality of settings from a description file of a virtual pan-tilt-zoom (PTZ) camera used to capture an original image through a wide-angle lens; determining, by the processor, based on the extracting, a first set of coordinates of a pixel of the original image for each cell of a sparse conversion map represented as a first look-up table, wherein the sparse conversion map corresponds to a sparse grid of pixels of an output image; determining, by the processor, via interpolating the first set of coordinates, a second set of coordinates of a pixel of the original image for each cell of a full conversion map, wherein the second set of coordinates is represented as a second look-up table, wherein the full conversion map corresponds to a full grid of pixels of the output image; instructing, by the processor, based on the interpolating, a display to present the output image, wherein the original image is less rectilinear than the output image.

Additional features and advantages of various embodiments are set forth in the description which follows, and in part is apparent from the description. Various objectives and other advantages of the present disclosure are realized and attained by various structures particularly pointed out in the embodiments in the written description and claims hereof as well as the appended drawings. It is to be understood that both the foregoing general description and the following detailed description are exemplary and explanatory and are intended to provide further explanation of the present disclosure as claimed.

BRIEF DESCRIPTION OF DRAWINGS

The accompanying drawings constitute a part of this specification and illustrate an embodiment of the present disclosure and together with the specification, explain the present disclosure.

FIG. 8B shows a flowchart of an embodiment of a process for determining a full transformation map (look-up table) according to the present disclosure.

DETAILED DESCRIPTION

The present disclosure is now described more fully with reference to the accompanying drawings, in which some example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art.

Figure 1:
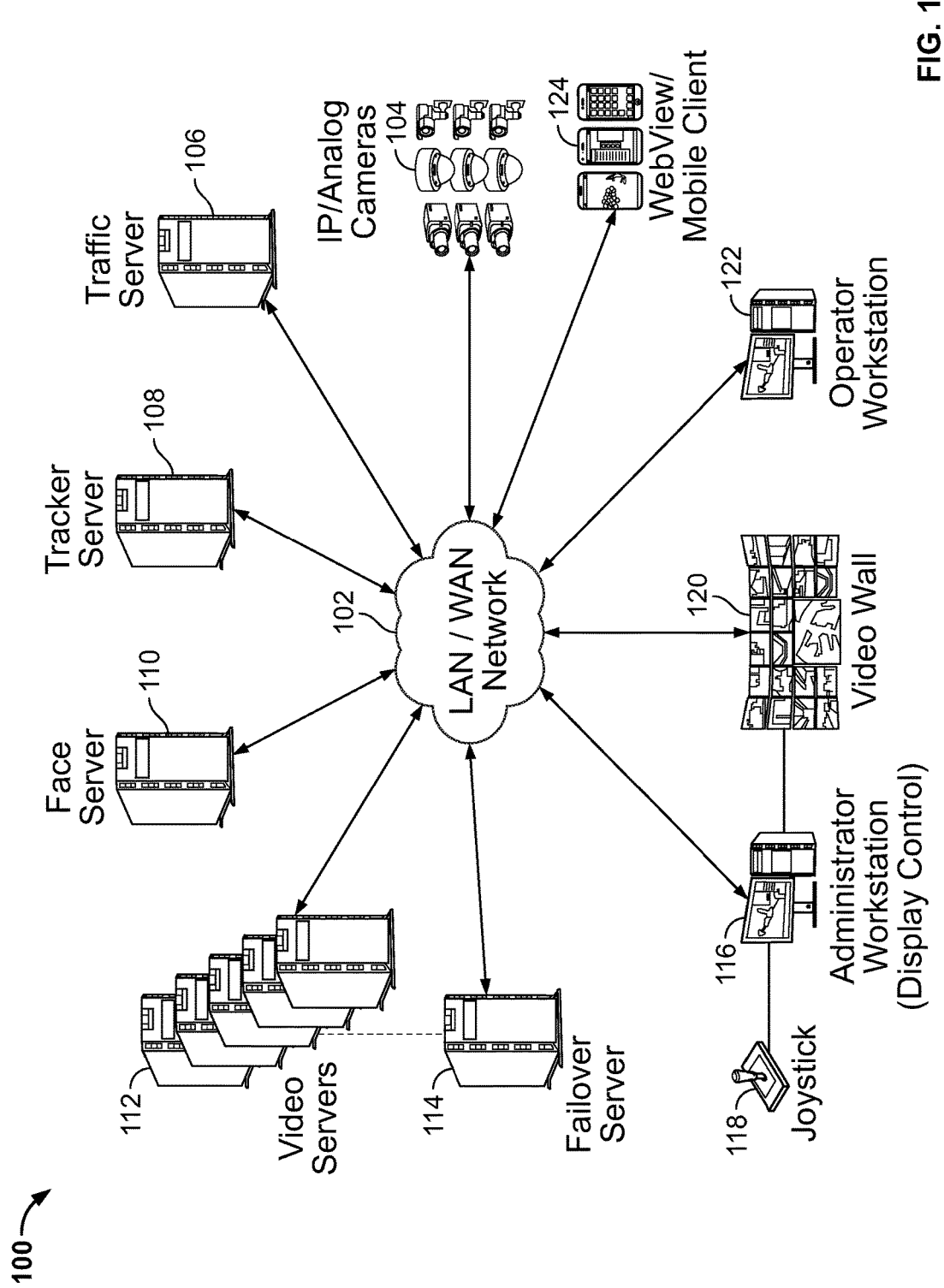
FIG. 1 shows a schematic view of an embodiment of a first network topology according to the present disclosure.

FIG. 1 shows a schematic view of an embodiment of a first network topology according to the present disclosure. A network topology 100 is implemented in logic, whether hardware-based or software-based, on a component basis. For example, when the logic is hardware-based, then such logic can comprise circuitry, such as processors, memory, input devices, output devices, or other hardware, that is configured, such as via programming or design, to implement a functionality of a respective component. Likewise, when the logic is software-based, then such logic can comprise one or more instructions, such as assembly code, machine code, object code, source code, or any other type of instructions, which when executed, such as via running or compilation, implement a functionality of a respective component. Also, note that at least one component of the topology 100 can be implemented as a service. Moreover, note that at least two components of the topology 100 can be hosted on one computing system/hardware/device or each be distinctly hosted.

The topology 100 is based on a distributed network operation model which allocates tasks/workloads between servers, which provide a resource/service, and clients, which request the resource/service. The servers and the clients illustrate different computers/applications, but in some embodiments, the servers and the clients reside in or are one system/device/framework/platform/application. Further, in some embodiments, the topology 100 entails allocating a large number of resources to a small number of computers, where complexity of the clients depends on how much computation is offloaded to the small number of computers, i.e., more computation offloaded from the clients onto the servers leads to lighter clients, such as being more reliant on network sources and less reliant on local computing resources. Note that other computing models are possible as well. For example, such models can comprise decentralized computing, such as peer-to-peer (P2P), for instance BitTorrent®, or distributed computing, such as via a computer cluster where a set of networked computers works together such that the computer can be viewed as a single system.

The network topology 100 comprises a network 102, a set of Digital/Analog cameras 104, a traffic server 106, a tracker server 108, a face server 110, a video server 112, a failover server 114, an administrator workstation 116, a joystick 118, a video wall 120, an operator workstation 122, and a web view or mobile client 124. All components of the topology 100 can be coupled directly or indirectly to the network 102, whether in a wired or a wireless manner.

The network 102 includes a plurality of nodes, such as a collection of computers and/or other hardware interconnected via a plurality of communication channels, which allow for sharing of resources and/or information. Such interconnection can be direct and/or indirect. The network 102 can be wired and/or wireless. The network 102 can allow for communication over short and/or long distances, whether encrypted and/or unencrypted. The network 102 can operate via at least one network protocol, such as Ethernet, a Transmission Control Protocol (TCP)/Internet Protocol (IP), and so forth. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, and so forth. The network 102 can be and/or include an intranet and/or an extranet. The network 102 can be and/or include Internet. The network 102 can include other networks and/or allow for communication with other networks, whether sub-networks and/or distinct networks, whether identical and/or different from the network 102 in structure or operation. The network 102 can include hardware, such as a computer, a network interface card, a repeater, a hub, a bridge, a switch, an extender, an antenna, and/or a firewall, whether hardware based and/or software based. The network 102 can be operated, directly and/or indirectly, by and/or on behalf of one and/or more entities or actors, irrespective of any relation to contents of the present disclosure.

The cameras 104 include one or more image capture devices or optical instruments for capturing or recording images, which may be stored locally, transmitted to another location, or both. The images may be individual still photographs or sequences of images constituting videos or movies. For example, at least one of the cameras 104 can comprise an image sensor, such as a semiconductor charge-coupled device (CCD) or an active pixel sensor in a complementary metal-oxide-semiconductor (CMOS) or an N-type metal-oxide-semiconductor (NMOS), and a lens, such a rectilinear lens, a wide-angle lens, a fish-eye lens, or any other lens. The cameras 104 can be analog or digital. For example, the cameras 104 can comprise a pan-tilt-zoom (PTZ) camera. For example, the cameras 104 can comprise a network camera, such as an IP camera. For example, the cameras 104 can comprise a webcam. Note that images can be analog or digital. The cameras 104 can comprise any type of lens, such as convex, concave, fisheye, or others. The cameras 104 can comprise any focal length, such as wide angle or standard. The cameras 104 can comprise a flash illumination output device. The cameras 104 can comprise an infrared illumination output device. The cameras 104 can is powered via mains electricity, such as via a power cable or a data cable. In some embodiments, the cameras 104 is powered via at least one of an onboard rechargeable battery, such as a lithium-ion battery, or an onboard renewable energy source, such as a photovoltaic cell, a wind turbine, or a hydropower turbine. The cameras 104 can be configured for geotagging, such as via modifying or appending an image file with geolocation/coordinates data. The cameras 104 can include or be coupled to a microphone.

The cameras 104 are configured to send or receive data via the network 102, such as via communicably coupling to the network 102. For example, at least one of the cameras 104 comprises a camera and a computer combined in one unit/housing, such as when a processor instructed to perform image processing, compression, video analysis, telemetry, and networking functionalities, and a memory coupled to the processor and storing camera's firmware, such as for performance of such functionalities, and local recording of video sequences. For example, video analytics can comprise license plate recognition, face recognition, container recognition, object tracking/unattended object detection, shrinkage detection, people counting, or others. For example, the cameras 104 can be coupled to sensors, such as thermal, X-ray, sound, fluid, pressure, or others, or relays, such as a solid state relay, an electromechanical relay, a machine tool relay, or others, whether physically, electrically, or logically. Some of the cameras 104 may have a unique IP address associated therewith. The cameras 104 can be configured to send video over the network 102 for live viewing and/or recording either continuously, at scheduled times, on an event or on request from authorized users. Captured images can be streamed as Motion Joint Photographic Experts Group (JPEG), Moving Picture Experts Group (MPEG)-4 or H.264 video using various networking protocols, or uploaded as individual JPEG images using file transfer protocol (FTP), e-mail or Hypertext Transfer Protocol (HTTP). The cameras 104 can be configured to provide event management or intelligent video functionalities, such as video motion detection, audio detection, active tampering alarm, license plate recognition, container tracking, face tracing, auto-tracking, traffic tracking, object tracking, unattended object detection, or others.

The cameras 104 can be centralized, which involve a central network video recorder (NVR) to handle recording, video, or alarm management. For example, the NVR can run on a computing device, such as on a dedicated device, such as with an embedded operating system (OS). Alternatively, to help support increased functionality and serviceability, a non-embedded OS can be used with a processor running a video management software application. For example, recording can be on a memory, such as a solid disk drive, a hard disk drive or a memory card. The cameras 104 can be decentralized, which do not involve a central NVR, as the cameras 104 can comprise a recording function logic component built-in and can thus record directly to a storage media, such as Secure Digital (SD) cards, network-attached storage (NAS), a personal computer, or a server. For example, the cameras 104 can allow a two-way audio via a single network cable to enable users to communicate with what the users are seeing, such as a gas station clerk assisting a customer on how to use a pay pump or a bank teller assisting a customer on how to use an automated teller machine (ATM). For example, the cameras 104 can function on a wireless network. For example, the cameras 104 can comprise a video analytics logic for an ability in analytics solutions. For example, the cameras 104 can offer secure data transmission through encryption and authentication methods, such as Wi-Fi Protected Access (WPA), WPA2, Temporal Key Integrity Protocol (TKIP), Advanced Encryption Standard (AES), or others. For example, the cameras 104 can be configured for remote accessibility, such as via a live video stream from a selected camera can be viewed from any computer, anywhere with a network connection, and also from a mobile devices or smartphones or other devices. For example, the cameras 104 can be configured for Power Over Ethernet capability (PoE), such as operating without a power supply, but over PoE.

Each of the servers 106, 108, 110, 112, 114 can be hardware-based and/or software-based. Each of the servers 106, 108, 110, 112, 114 is and/or is hosted on, whether directly and/or indirectly, a server computer, whether stationary or mobile, such as a kiosk, a workstation, a vehicle, whether land, marine, or aerial, a desktop, a laptop, a tablet, a mobile phone, a mainframe, a supercomputer, a server farm, and so forth. The server computer can comprise another computer system and/or a cloud computing network. The server computer can run any type of OS, such as MacOS®, Windows®, Android®, Unix®, Linux® and/or others. The server computer can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The server computer can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic. The server computer can include circuitry, such as a receiver chip, for geolocation/global positioning determination, such as via a global positioning system (GPS), a signal triangulation system, and so forth. The server computer can be equipped with near-field-communication (NFC) circuitry, such as an NFC chip. The server computer can host, run, and/or be coupled to, whether directly and/or indirectly, a database, such as a relational database or a non-relational database, such as a post-relational database, an in-memory database, or others, which can feed, avail, or otherwise provide data to at least one of the servers 106, 108, 110, 112, 114, whether directly and/or indirectly. Each of the servers 106, 108, 110, 112, 114 can be at least one of a network server, an application server, or a database server. At least two of the servers 106, 108, 110, 112, 114 can be a single device.

Each of the servers 106, 108, 110, 112, 114, via the server computer, can be in communication with the network 102, such as directly and/or indirectly, selectively and/or unselectively, encrypted and/or unencrypted, wired and/or wireless. Such communication can be via any logic, whether hardware-based or software-based, such as a circuit, a software application, a software module, a mobile app, a browser, a browser extension, an OS, and/or any combination thereof. For example, such communication can be via a common framework/application programming interface (API), such as Hypertext Transfer Protocol Secure (HTTPS).

Based on receiving images from the cameras 104 over the network 102, the server 106 can perform many functions. Any of such functionalities can be provided via an application, a function, a module, a script, a circuit, a device, or any other logic, whether hardware-based or software-based, running, coupled, or otherwise accessible to the server 106, where such logic can be enabled to scale up from small deployments to architectures of unlimited cameras. For example, the server 106 can be configured to detect in real-time one or more types of traffic violations, which may include vehicle speeding, vehicle red light violations, and vehicle exiting onto oncoming traffic. The server 106 can be configured to operate in conjunction with a license plate recognition software or device to detect a violation and link the violation to a license plate number of a vehicle. The server 106 can be configured to support geographically distributed network solutions with a multi-site architecture and a single data repository. The server 106 can be configured to allow video monitoring of traffic violations on a scale of specific roads/highways or complete cities or specific geographic areas. For traffic violations, the server 106 can integrate or couple with traffic and law enforcement databases, whether local to or remote from the server 106, allowing a user to identify an owner of a vehicle who has committed a violation, and to simplify and automate a process of managing citations. The server 106 can be configured to support an automatic search of car records, such as for stolen cars. The server 106 can be configured to enable 24/7/365 monitoring of a situation on a road, which allows to record most or all cases of offenses in an area of video monitoring and increase efficiency by issuance of citations with minimal human interaction, thereby allowing law enforcement to dedicate more time to more critical activities. The server 106 can be configured to enable collection of data, about most or all violations that occurred, in a single or multiple databases with gathered information about a license plate of a vehicle, a type of an offense, a time, a date and a place of the offense defined by a radar, as well as saved photos and links to a corresponding video clip in an archive, whether local to or remote from the server 106. Such single or multiple databases can store information about a camera and a radar, from which data was received with corresponding information (records). The server 106 can be configured to facilitate a display on an operator's monitor, such as the workstation 122, records about an offense and generate an instant alerts, such as via e-mail, texting, chat, telephone, over-the-top messaging, social network post, sound, vibration, or others. The server 106 can be configured to support diverse license plates records and verification of identified license plate number of a vehicle in various state, municipal, federal, sovereign, and other geographic or regional databases. Note that more than one server 106 may be used, such as based on data load.

In some embodiments, in order to identify vehicles that have committed a traffic offense, the server 106, which can be housed in a data center, can use a hardware-software video monitoring which includes an intelligent module, one or more video cameras, such as the cameras 104, radars and external data processing unit, including an industrial computer and network equipment. For an ability to register offenses at night time, spot lighting in designated surveillance zones may be used. For example, the server 106 can serve data to an operator over the network 102, where the operator is operating the workstation 122, and where the data is informative of violations (type of offense, time, license plate number, registration number) and contains image snapshots of the violations. Therefore, such configuration provides an ability to view live video, whether all cameras at once or groups at once, such as two to five cameras per group. Such distributed network architecture can reduce data traffic, such for lower bandwidth situations.

In some embodiments, the server 106 can be configured to identify and record traffic violations via analyzing information received from surveillance cameras communicably synchronized with stationary and mobile speed detection radar, traffic signal controllers, railroad crossing gates, or others. For example, some of such violations include crossing vehicle red lights, bypass of closed or closing rail road crossing gates or entrance to railway crossings during prohibitory signals, such as red flashing lights, crossing a railway track outside a permitted zone, driving in lanes designated for public transportation, bicycle lanes or pedestrian paths or sidewalks, entrance against traffic or driving in prohibited areas, turn or U-turn violations of one or more traffic signs or markings on a highway/roadway/carriageway, movement in an opposite direction on one-way roads, failure to provide right of crossing to one or more pedestrians, or others. The server 106 can be configured for integration with software platforms for automated preparation of a citations of an administrative offense, sending the citation to an owner of the vehicle, such as via email, chat, social network post, texting, fax, over-the-top message, or a printout, as well as optionally tracking payments of fines.

Based on receiving images from the cameras 104 over the network 102, the server 108 can perform many functions. Any of such functionalities can be provided via an application, a function, a module, a script, a circuit, a device, or any other logic, whether hardware-based or software-based, running, coupled, or otherwise accessible to the server 108, where such logic can be enabled to scale up from small deployments to architectures of unlimited cameras. For example, the server 108 can be configured for object tracking or unattended object detection. For example, the object tracking can be performed via associating target objects in consecutive video frames via a motion model which describes how an image of a target might change for different possible motions of an object. For example, tracking planar object involved the motion model comprising a 2D transformation of an image of an object. For example, when tracking a rigid 3D object, then the motion model defines an aspect of the rigid 3D object based on 3D position/orientation. The object tracking can involve an algorithm comprising target representation/localization, filtering, and data association. For example, the target representation/localization can comprise blob tracking, kernel-based tracking, contour tracking, or others. For example, the filtering can comprise a Kalman filter or a particle filter. For example, the unattended object detection can be via a technology disclosed in U.S. Pat. No. 7,683,929, which is fully incorporated by reference herein for all purposes. However, note that other technical methodologies for the unattended object detection may be used, in whole or in part, whether additionally or alternatively. Note that more than one server 108 may be used, such as based on data load.

Based on receiving images from the cameras 104 over the network 102, the server 110 can perform many functions. Any of such functionalities can be provided via an application, a function, a module, a script, a circuit, a device, or any other logic, whether hardware-based or software-based, running, coupled, or otherwise accessible to the server 110, where such logic can be enabled to scale up from small deployments to architectures of unlimited cameras. For example, the server 110 can be configured for face capture and recognition. For example, the face capture and recognition can be via a technology disclosed in United States Patent Application Publication 2011/0257985, which is fully incorporated by reference herein for all purposes. However, note that other technical methodologies for the face capture and recognition may be used, in whole or in part, whether additionally or alternatively. For example, the server 110 can be configured for archiving facial images in a database for real time identification. Such storage can be used for active recognition where subjects know that images are being captured or passively, where the subjects do not have knowledge of such surveillance. For example, the server 110 can be configured for use as a standalone system or in conjunction with an access control or other third party systems to enhance functionality. For example, the server 110 can be configured for specifying customized reactions to positive comparison, simultaneous multiple face detections, face capture during high-speed movements, single click access to video associated to faces, controlled area search and capture, automatic optimal face position, transmission, and comparison, integrated access control, biometrics or other devices, high speed of identification, such as less than one second, instant information search in video archive, automatic notification, such as telephone, e-mail, texting, over-the-top messaging, social media post, sound, vibration, external output, multiple face captures per server, unlimited number of aggregate face capture detectors within a security network all reporting to one centralized face recognition database, or others. Note that more than one server 110 may be used, such as based on data load.

In some embodiments, the server 110 can be configured for automatic registration and saving in database of video image, date, time and face coordinates on a video, comparison of information at arrival/departure of persons, integration with time and attendance systems, recognition of very important people (VIP) guests or unwanted persons, or protection of strategic and high security areas.

The video server 112 includes at least one server which is configured to function as an interface or an intermediary between a first segment and a second segment over the network 102. Any of such functionalities can be provided via an application, a function, a module, a script, a circuit, a device, or any other logic, whether hardware-based or software-based, running, coupled, or otherwise accessible to the server 112, where such logic can be enabled to scale up from small deployments to architectures of unlimited cameras or devices. The first segment comprises the cameras 104, the server 106, the server 108, and the server 110. The second segment comprises the workstation 116, the video wall 120, the workstation 122, and the client 124. For example, over the network 102, the cameras 104 feed images to the server 106, the server 108, or the server 110, which can process such images, as disclosed herein, and can store such images or any information obtained, extracted, associated, or linked from the images locally, such as on the server 106, the server 108, or the server 110, or on the server 112, such as in a database hosted thereon. Over the network 102, the workstation 116 or the workstation 122 can communicably interface with the server 112 in order to get access to such images or such information, whether from the server 112 or the server 106, the server 108, or the server 110. For example, the access can be read access, write access, delete access, or any other access. Additionally or alternatively, over the network 102, the workstation 116 or the workstation 122 can communicably interface with the server 106, the server 108, or the server 110, without using the server 112. Additionally or alternatively, over the network 102, the workstation 116 or the workstation 122 can communicably interface with the server 112 in order to control the cameras 104. Additionally or alternatively, over the network 102, the workstation 116 or the workstation 122 can communicably interface with the cameras 104 in order to control the cameras 104, without using the server 112. Additionally or alternatively, over the network 102, the video wall 120 can receive data from the server 112 in order to display such data based on such data being fed to the server 112 from the server 106, the server 108, or the server 110, or even the cameras 104. Additionally or alternatively, over the network 102, the video wall 120 can receive data from the server 106, the server 108, or the server 110, or even the cameras 104, in order to display such data, without using the server 112. Additionally or alternatively, over the network 102, the video wall 120 can receive data from the server 112 in order to display such data based on such data being fed to the server 112 from the cameras 104. Additionally or alternatively, over the network 102, the video wall 120 can receive data from the cameras 104 in order to display such data, without using the server 112.

The server 114 includes at least one server which is configured to function as a redundancy device for the server 112, such as when the server 112 is overloaded, malfunctions, inoperative, or unavailable. The server 114 can be signally coupled to the server 112, whether directly or indirectly, such as via periodic pinging or heartbeat/pulse signal, and be activated, such as based on a condition, such as the server 112 being overloaded, malfunctions, inoperative, or unavailable, or operate concurrently with the server 112. Any of such functionalities can be provided via an application, a function, a module, a script, a circuit, a device, or any other logic, whether hardware-based or software-based, running, coupled, or otherwise accessible to the server 114, where such logic can be enabled to scale up from small deployments to architectures of unlimited cameras or devices. For example, the server 114 can be coupled to the network 102 and can be configured to function as the server 112. For example, the server 114 can be configured to switch on or operate as a redundant or standby computer server, system, hardware component or network upon a failure or abnormal termination of a previously active application, server, system, hardware component, logic, or network, such as the server 112 or the server 110, the server 108, or the server 106. For example, the server 114 can be configured as a failover to activate automatically or the server 114 can be configured as a switchover to be activated manually. Note that another server may be used, which can function as a spare parts server that has running spare components for hot switching to prevent downtime.

The topology 100 includes one or more clients, such as the workstation 116, the video wall 120, the workstation 122, or the client 124. At least one of such clients can be hardware-based and/or software-based. At least one of such clients is and/or is hosted on, whether directly and/or indirectly, a client computer, whether stationary or mobile, such as a terminal, a kiosk, a workstation, a vehicle, whether land, marine, or aerial, a desktop, a laptop, a tablet, a mobile phone, a mainframe, a supercomputer, a server farm, and so forth. The client computer can comprise another computer system and/or cloud computing network. The client computer can run any type of OS, such as MacOS®, Windows®, Android®, Unix®, Linux® and/or others. The client computer can include and/or be coupled to an input device, such as a mouse, a keyboard, a camera, whether forward-facing and/or back-facing, an accelerometer, a touchscreen, a biometric reader, a clicker, a microphone, or any other suitable input device. The client computer can include and/or be coupled to an output device, such as a display, a speaker, a headphone, a joystick, a printer, or any other suitable output device. In some embodiments, the input device and the output device can be embodied in one unit, such as a touch-enabled display, which can be haptic. The client computer can include circuitry, such as a receiver chip, for geolocation/global positioning determination, such as via a GPS, a signal triangulation system, and so forth. The client computer can be equipped with NFC circuitry, such as an NFC chip. The client computer can host, run and/or be coupled to, whether directly and/or indirectly, a database, such as a relational database or a non-relational database, such as a post-relational database, an in-memory database, or others, which can feed or otherwise provide data to at least one of such clients, whether directly and/or indirectly. At least one of such clients, via the client computer, is in communication with network 102, such as directly and/or indirectly, selectively and/or unselectively, encrypted and/or unencrypted, wired and/or wireless, via contact and/or contactless. Such communication can be via a software application, a software module, a mobile app, a browser, a browser extension, an OS, and/or any combination thereof. For example, such communication can be via a common framework/API, such as HTTPS. In some embodiments, a server, such as the server 106, the server 108, the server 110, the server 112, or the server 112, and at least one of such clients can also directly communicate with each other, such as when hosted in one system or when in local proximity to each other, such as via a short range wireless communication protocol, such as infrared or Bluetooth®. Such direct communication can be selective and/or unselective, encrypted and/or unencrypted, wired and/or wireless, via contact and/or contactless. Since many of such clients can initiate sessions with a server, such as the server 106, the server 108, the server 110, the server 112, or the server 112, relatively simultaneously, in some embodiments, such server can employ load-balancing technologies and/or failover technologies for operational efficiency, continuity, and/or redundancy. In some embodiments, at least one of such clients can communicate with the cameras 104, whether directly or indirectly.

The workstation 116 can comprise a client which presents a graphical user interface (GUI) configured to depict one or more GUI pages, where at least one of such pages comprises one or more visual elements enabling a control of any aspect of the topology 100, such as any hardware, software, or any other logic or functionality. For example, the workstation 116 can be configured to control the network 102 or any device communicating over the network 102 or coupled thereto, as disclosed herein, such as the cameras 104, the server 106, the server 108, the server 110, the server 112, the server 114, the workstation 116, the joystick 118, the video wall 120, the workstation 122, or the client 124. Note that such control can be direct or indirect, whether wired or wireless.

The joystick 118 comprises an input device including a stick, a base, and a logic, whether hardware-based or software-based, for reporting at least an operation of the stick with respect to the base. The stick cantileveredly pivots on the base and the logic reports an angle or direction of the stick to a device coupled to the joystick 118, such as the workstation 118, whether directly or indirectly, whether in a wired or wireless manner. The stick or the base may include one or more buttons or switches or levers. The joystick 118 may receive power from the device coupled thereto, such as the workstation 116, or be battery powered. Alternatively or additionally, the joystick 118 may comprise an analog stick, a miniature finger-operated joystick, a trigger, a button, a gamepad or a touch-enabled interface, such a touchscreen, such as a mobile phone or a tablet. Alternatively or additionally, the joystick 118 may comprise a feedback functionality or device, such as via vibration or haptic output. The joystick 118 provides input to the workstation 116 such that the workstation 116 can control the cameras 104 over the network 102 or the video wall 120, whether directly or indirectly, whether in a wired or wireless manner. For example, such control may comprise orientation, panning, tilting, zooming, moving, snapshot capture, functionality activation, turn on/off, or others.

The video wall 120, which can comprise a client, comprises a multi-display array which includes a plurality of displays, such as computer monitors, video projectors, or television sets, tiled or tessellated together contiguously or overlapped in order to form a single aggregate display. For example, at least one of the displays can comprise a liquid crystal display (LCD), a plasma display, a light emitting diode (LED) display, or others, whether identical to or different from each other in display technology, shape, or size. The displays are positioned immediately adjacent to each other to reduce mullion. The displays include logic, whether hardware-based or software-based, and mounting/coupling hardware to position displays adjacent to each other, along with connections to daisy chain power, video, and command signals therebetween. For example, a command signal may power some or all displays in the video wall 120 on or off, or calibrate a brightness or contrast or other visual characteristic of a single display, such as after a bulb replacement. The video wall 120 can be coupled to the workstation 116, whether directly or indirectly, whether in a wired or wireless manner. The video wall 120 can be communicably coupled to the network 102. Over the network 102, the video wall 120 can receive data from the workstation 116, the workstation 122, the client 124, the server 112, the server 110, the server 108, the server 106, or the cameras 104, whether directly or indirectly, whether in a wired or wireless manner.

The workstation 122 can comprise a client which presents a GUI configured to depict one or more GUI pages, where at least one of such pages comprises one or more visual elements enabling an access to images from the cameras 104, whether directly or indirectly, such as from the workstation 116, the client 124, the server 112, the server 110, the server 108, the server 106, or the cameras 104. For example, such access can comprise reading, writing, deleting, or others. The workstation 122 can be configured to receive an access to any information obtained, extracted, associated, or linked from the images, such as via the server 106, the server 108, the server 110, or the server 112, such as in a database hosted thereon. For example, such access can comprise reading, writing, deleting, or others.

In some embodiments, the topology 100 can be configured for video management and video analytics, as a nucleus of a complete surveillance and security management topology. Such framework can manage and monitor an unlimited number of networked cameras (analog or digital) and devices, apply intelligent video analytics, and integrate a variety of disparate systems into one centralized command and control interface. The topology 100 can be suited for large mission critical applications that involve hundreds or thousands of cameras, sensors and control systems unified into one network architecture. The topology 100 can comprise an additive/modular architecture where new functionalities and capabilities can generally be added with minimal software management. The topology 100 can comprise an open architecture to integrate third party systems and devices into one common monitoring/management platform. The topology 100 can be configured for event/scenario management program rules based complex reactions to complex events to intelligently and dynamically react to real world events. The topology 100 can be configured to provide a scripting interface to create new event management capabilities and reactions on-the-fly. The topology 100 can be configured for integration with business process systems allows for proactive action. The topology 100 can be configured for customization based on user need from multilayer maps, custom user-based screens and permissions, to custom forms, and graphical user interfaces (GUIs).

In some embodiments, the topology 100 may include a storage controller coupled to a server, as disclosed herein, whether directly or indirectly. Such controller can comprise a device which manages a disk drive or other storage, such as flash storage, and presents the disk drive as a logical unit for subsequent access, such as various data input/output (TO) operations, including reading, writing, editing, deleting, updating, searching, selecting, merging, sorting, or others. The storage controller can include a front-end side interface to interface with a host adapter of a server and a back-end side interface to interface with a controlled disk storage. The front-end side interface and the back-end side interface can use a common protocol or different protocols. Also, the storage controller can comprise an enterprise controller, which can comprise a physically independent enclosure, such as a disk array of a storage area network or a network-attached storage server. For example, the storage controller can comprise a redundant array of independent disks (RAID) controller. In some embodiments, the storage controller can be lacking such that a storage can be directly accessed by a server. In some embodiments, the controller can be unitary with a server.

The storage can comprise a storage medium, such as at least one of a data structure, a data repository, a data mart, or a data store. For example, the storage medium comprises a database, such as a relational database, a non-relational database, an in-memory database, or others, which can store data and allow access to such data to the storage controller, whether directly and/or indirectly, whether in a raw state, a formatted state, an organized stated, or any other accessible state. For example, the data can comprise image data, sound data, alphanumeric data, or any other data. For example, the storage can comprise a database server. The storage can comprise any type of storage, such as primary storage, secondary storage, tertiary storage, off-line storage, volatile storage, non-volatile storage, semiconductor storage, magnetic storage, optical storage, flash storage, hard disk drive storage, floppy disk drive, magnetic tape, or other data storage medium. The storage is configured for various data I/O operations, including reading, writing, editing, modifying, deleting, updating, searching, selecting, merging, sorting, encrypting, de-duplicating, or others. In some embodiments, the storage can be unitary with the storage controller. In some embodiments, the storage can be unitary with a server.

Note that any computing device as described herein comprises at least a processing unit and a memory unit operably coupled to the processing unit. The processing unit comprises a hardware processor, such as a single core or a multicore processor. For example, the processing unit comprises a central processing unit (CPU), which can comprise a plurality of cores for parallel/concurrent independent processing. The memory unit comprises a computer-readable storage medium, which can be non-transitory. The storage medium stores a plurality of computer-readable instructions for execution via the processing unit. The instructions instruct the processing unit to facilitate performance of a method for image processing, as disclosed herein. For example, the processing unit and the memory unit can enable various file or data input/output operations, including reading, writing, editing, modifying, deleting, updating, searching, selecting, merging, sorting, encrypting, de-duplicating, or others. The memory unit can comprise at least one of a volatile memory unit, such as random access memory (RAM) unit, or a non-volatile memory unit, such as an electrically addressed memory unit or a mechanically addressed memory unit. For example, the electrically addressed memory comprises a flash memory unit. For example, the mechanically addressed memory unit comprises a hard disk drive. The memory unit can comprise a storage medium, such as at least one of a data repository, a data mart, or a data store. For example, the storage medium can comprise a database, such as a relational database, a non-relational database, an in-memory database, or other suitable databases, which can store data and allow access to such data via a storage controller, whether directly and/or indirectly, whether in a raw state, a formatted state, an organized stated, or any other accessible state. The memory unit can comprise any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

In one mode of operation, an administrator operating the workstation 116 and controlling the cameras 104 through the joystick 118 over the network 102, instructs the cameras 104 to initiate capturing of a plurality of images. The cameras 104 capture the images and send the images to at least one of the server 106, the server 108, the server 110 over the network 102 for processing, as disclosed herein. For example, such processing can comprise auto traffic imagery or facial recognition processing. Upon completion of processing, at least one of the server 106, the server 108, the server 110 sends the processed images to the server 112 over the network 102 for storage, feeding the video wall 120 over the network 102, or viewing by an operator operating the workstation 122 or the client 124 over the network 102. If the server 112 is disabled, then the server 114 automatically takes over for the server 112 over the network 102. At least one of the server 106, the server 108, the server 110, the server 112, or the server 114 can automatically send a message over the network 102 to at least one of the workstation 116, the workstation 122, or the client 124 based on detecting a pattern in at least one of the images, as disclosed herein.

Figure 2:
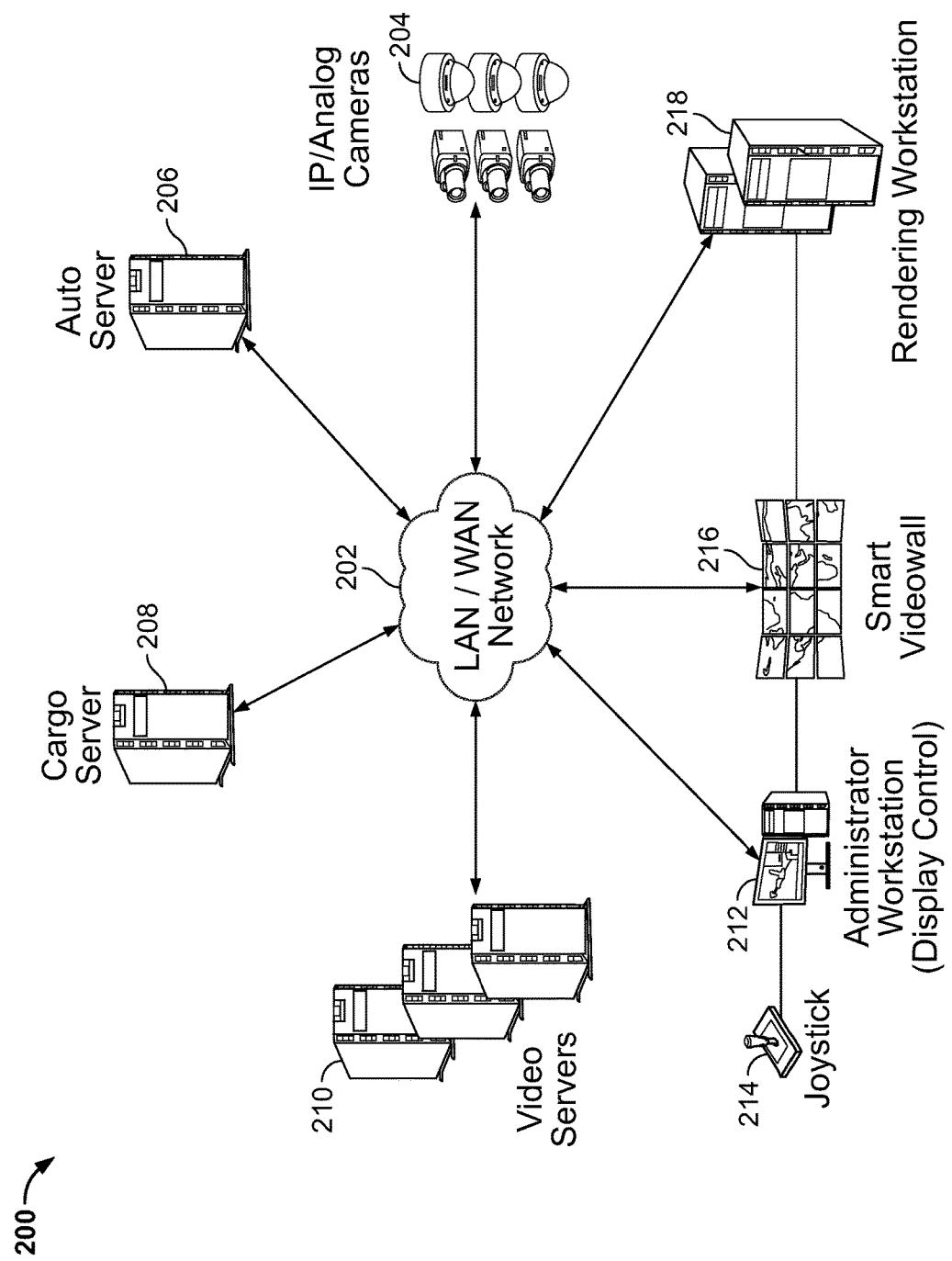
FIG. 2 shows a schematic view of an embodiment of a second network topology according to the present disclosure.

FIG. 2 shows a schematic view of an embodiment of a second network topology according to the present disclosure. A network topology 200 is configured similar to the topology 100, such as via an inclusion of a network 202, which is similar to the network 102, a set of Digital/Analog cameras 204, which is similar to the cameras 104, a video server 210, which is similar to the server 112, an administrator workstation 212, which is similar to the workstation 116, a joystick 214, which is similar to the joystick 118, a smart or dumb video wall 216, which is similar to the video wall 120, and a rendering workstation 218, which is similar to the workstation 122.

The topology 200 comprises an auto server 206 and a cargo server 208. The topology 200 can be enabled to visually display camera icons and devices on on-screen maps, integrate with third party systems, implement robust user rights management or connect with Active Directory service, or comprises a capability to run user-developed scripts in standardized languages, such as VBScript and Jscript. The topology 200 can be configured for enabling image analytics, such as face recognition, license plate recognition, point-of-sale (POS) device monitoring, ATM transaction monitoring and synchronization or container recognition, as disclosed herein.

Based on receiving images from the cameras 204 over the network 202, the server 206 can perform many functions. Any of such functionalities can be provided via an application, a function, a module, a script, a circuit, a device, or any other logic, whether hardware-based or software-based, running, coupled, or otherwise accessible to the server 206, where such logic can be enabled to scale up from small deployments to architectures of unlimited cameras. For example, the server 206 can be configured for license plate recognition to provide a number of advantages for users, including an ability to capture license plate information, such as at about 130 miles per hour, or various weather conditions, including light fog, rain, or snow. For example, such configuration can result in a sort of pinpoint accuracy that distinguish letters from numbers, so that, for example, a number "8" is not mistaken for a letter "B", which is an advantage, particularly in emergency situations when one has only milliseconds to be correct. The server 206 can be configured to integrate with third party parking management or smart roadway systems, as well as legacy security equipment and external databases, which can be effective for vehicle registration tasks, control of traffic, and the access control of vehicles. For example, the server 206 can be configured for vehicle detection and license plate capture based on image analytics, which can be without using sensors or external devices. Such functionality can be provided via the server 206 being configured for (1) multiple frame analysis for higher accuracy, (2) provision of advanced reaction capability and automatic notification based on license plate recognition and/or comparison with information from a database, whether local or remote, (3) integration with the third party equipment and devices, such as barriers, automatic gate, weight scale, or traffic management systems, (4) real-time video management and access to video archive embedded, (5) license plate database allowing search for most or all images, video, information of time, date, direction of a vehicle, (6) integration with external databases such as stolen or unlicensed vehicles, (7) high quality license plate recognition in various conditions and luminosity, (8) fast adaptation for work with new standards of license plates.

In some embodiments, the server 206 can be configured for use in or in proximity of parking areas, providing vehicle safety, increase of speed and quality of service, and a reduction of unauthorized access, fraud and theft. Such functionality can be provided via the server 206 being configured for (1) automatic registration and saving in a database of video image, date, time, plate numbers of incoming and outgoing cars, (2) comparison of information at arrival/departure of vehicle, (3) simplified information search in a database on the car plate numbers, date or time of parking, (4) integration with barriers or automatic gates, (5) integration with the automatic systems of calculations for payment control, (6) protection of strategic areas and high security areas, (7) integration with a gravimetric equipment, executive devices on entrances/exits (arrival/departures), and also with workflow systems for effective automated accounts management, (8) creation of detailed statistical reports, or (9) video-control in real-time of loading/unloading processes of raw materials or finished goods.

In some embodiments, the server 206 can be configured for use in providing municipal services, such as via an integration with a traffic monitoring logic, as disclosed herein, or other third party traffic management software to create a safe traffic hub for municipalities, restrict entry into municipal areas based on preset policies, utilization for toll payment system, use by police and other municipal services, such as via automatic registration in traffic of vehicles which are flagged for search, analysis and alarms for infringement of road rules.

In some embodiments, the server 206 can be configured for license plate capture and recognition, such as for parking, access control, and border crossing installations, especially for a limited network connectivity. Such functionality can be provided via the server 206 being configured for interfacing with or receiving data from a computer running an embedded module on an AXIS® Camera Application Platform (AXIS ACAP) or a Samsung® Open Platform for supported cameras. Such module can be configured to analyze a raw camera video and send selected JPEGs (with captured license plates) and metadata to the server 206 for recognition. This configuration can work with the server 206 to deliver high-resolution streams to servers or clients of the topology 200 with video of one or more vehicles passing.

Based on receiving images from the cameras 204 over the network 202, the server 208 can perform many functions. Any of such functionalities can be provided via an application, a function, a module, a script, a circuit, a device, or any other logic, whether hardware-based or software-based, running, coupled, or otherwise accessible to the server 208, where such logic can be enabled to scale up from small deployments to architectures of unlimited cameras. For example, the server 208 can be configured for character recognition of carriages, tankers, and platforms on trains, boats, trucks, or other vehicles. For example, such functionality can be an effective tool for registration of railway vehicles at a shunting-yard or a customs terminals, and also for a control of container or a delivery to industrial enterprises, storehouses, or others. Such functionality can be provided via the server 208 being configured for (1) character recognition, (2) multiple formations of video-archive (in movement), whether segmented carriage by carriage or in full composition, (3) formations of video-archive by carriage numbers, date and time of travel, direction of movement, result of check of payment, serial number of the carriage, quantities (amounts) of carriages, average speed in control area (zone), (4) information search in video-archive and database on given characteristics: date and time of pass, carriage number, video-camera's number, automatic comparison of carriage numbers with data from internal or external database, (5) formatting and definition of railroad cars' types, (6) comparison of railway vehicles numbers with data of wheel-report, detection of railroad cars without numbers, (7) automatic count of railroad cars in railway vehicle, (8) check of integrity of a cargo located in open railroad car or a platform, (9) control of cargo's position on transport platforms, (10) visual control of railroad cars: check of integrity of railroad cars' body, presence of seals on locks, (11) check of conformity of cargo's overall dimensions to railroad car's overall dimensions. For such functionality, the workstation 212 or the workstation 218 can be configured for providing a GUI with a wide spectrum of user's functions: (1) export video to audio video interleave (AVI)/JPEG, (2) printing and/or sending by e-mail, digital zoom, social network post, over-the-top message, texting, chatting, or faxing, (3) adjustment (tuning) of color and contrast, (4) remote control by video cameras, (5) automatic notification of operator at registration of unrecognized numbers, at discrepancy of recognition results to a data of wheel-report, (5) formation of reports, analytics of events and detailed statistical output, (7) interaction with components of integrated security systems, enterprise railway management systems, software and information systems, external databases, manufacturing equipment and electronic weights or sensors, (8) organization of geographically distributed system, (9) simultaneous work over several video channels, (10) data transmission on lower-bit-rate communication channels, (11) organization of common database and workplaces for monitoring and management with differentiation of rights of access to data and work with system, (12) adjustment of reaction of system and way of operator notification (sound, phone, texting, fax, chat, social network post, over-the-top message, e-mail) in case of discrepancy between number recognition and data of natural sheets, at registration of unusual events, (13) interfacing with cameras may be placed above railway for automatic control of presence/absence of a cargo, (14) fast adaptation according to features of object and requirements of an end user, (15) adjustment for work with legacy video-cameras.

In one mode of operation, an administrator operating the workstation 212 and controlling the cameras 204 through the joystick 214 over the network 202, instructs the cameras 204 to initiate capturing of a plurality of images. The cameras 204 capture the images and send the images to at least one of the server 206, the server 208 over the network 202 for processing, as disclosed herein. For example, such processing can comprise cargo container imagery processing. Upon completion of processing, at least one of the server 206, the server 208 sends the processed images to the server 210 over the network 202 for storage, feeding the video wall 216 over the network 202, or viewing by the administrator operating the workstation 212 over the network 202. At least one of the server 206, the server 208, the server 210 can automatically send a message over the network 202 to the workstation 212 based on detecting a pattern in at least one of the images, as disclosed herein.

Figure 3:
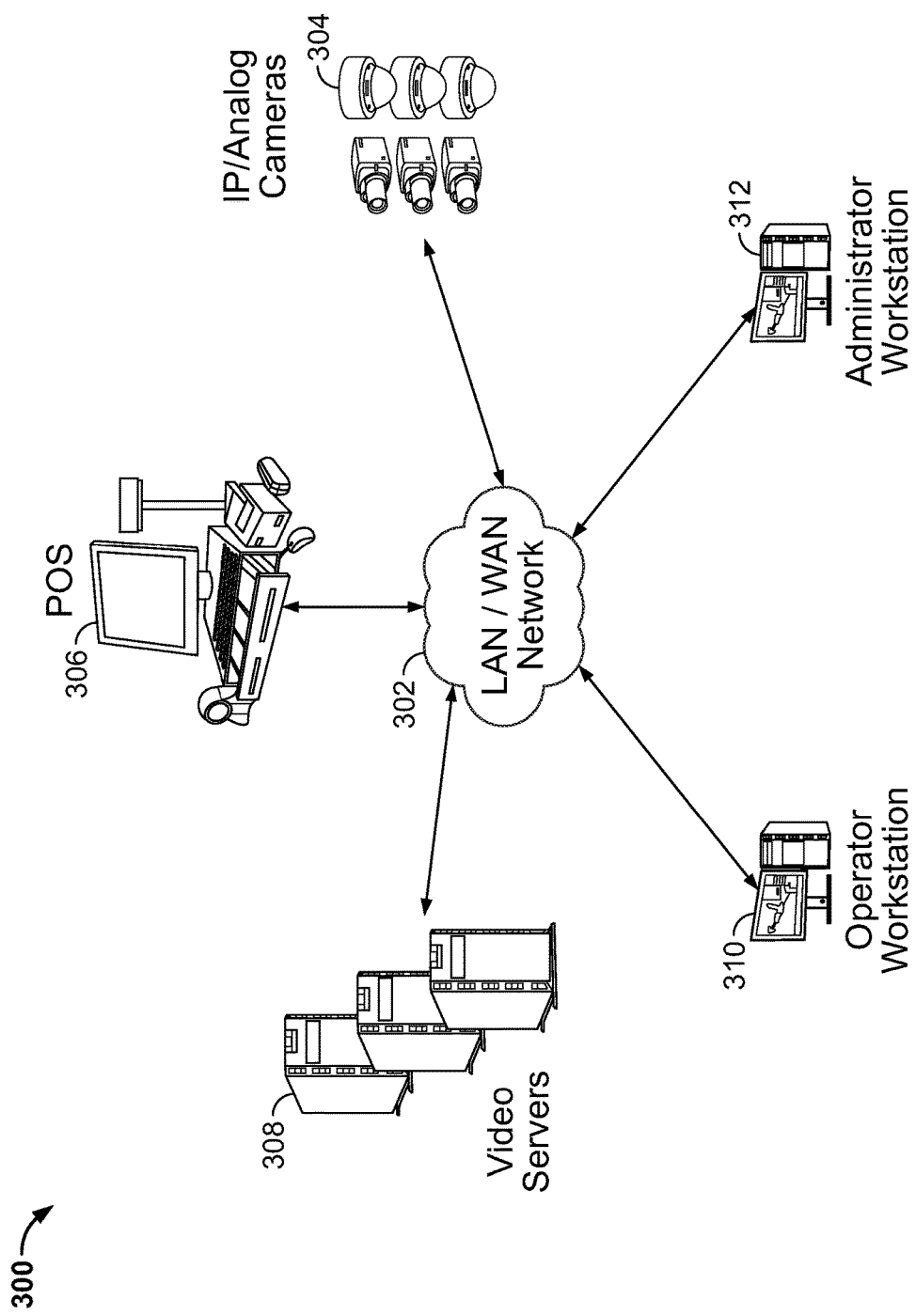
FIG. 3 shows a schematic view of an embodiment of a third network topology according to the present disclosure.

FIG. 3 shows a schematic view of an embodiment of a third network topology according to the present disclosure. A network topology 300 is configured similar to the topology 100, such as via an inclusion of a network 302, which is similar to the network 102, a set of Digital/Analog cameras 304, which is similar to the cameras 104, a video server 308, which is similar to the server 112, an administrator workstation 312, which is similar to the workstation 116, an operator workstation 310, which is similar to the workstation 122.

The topology 300 comprises a POS device 306, which can comprise a weight scale, a scanner, a cash register, a payment terminal, a touch screen, a keyboard, a display, a speaker, a microphone, a printer, or other input, processing, or output devices. Additionally or alternatively, an ATM can be incorporated into the topology 300. Such functionality can be provided via the server 308 be configured for logic, whether hardware-based or software-based, such as a circuit, a module, a function, or other logic for POS or ATM monitoring. For example, such monitoring can comprise partial or full video documentation on selected transaction identifiers (IDs), item numbers, terminal numbers, employees, customers, payment details, or stores in any combination. Such monitoring can be helpful to effectively combat fraud and loss occurring in transactions. For example, such monitoring can be integrated with other analytics to provide a partial or complete retail solution, including recognition of known shoplifters, inventory management, after-hours surveillance, license plate recognition for gas stations. For example, such monitoring can provide a toolset for integrated retail surveillance, empowerment of exception reports, and shrinkage detection, while (1) allowing the server 308 to be integrated with other sub-systems, databases, and third-party systems, as disclosed herein, (2) specifying a reaction to positive comparison, (3) enabling instant data search in video archive, automatic notification (phone, e-mail, chat, fax, over-the-top message, social networking post), (4) distributed and modular architecture to enable remote database query, monitoring and storage.

In one mode of operation, the cameras 304 are positioned in proximity of the POS 306 or capture events occurring in proximity of the POS 306. The cameras 304 feed imagery data to the server 308 over the network 302 and the POS 306 feeds transaction data to the server 308. The server 308 processes the imagery data, as disclosed herein, such as for object tracking in accordance with the transaction data. The server 308 correlates the imagery data, as processed, and the transaction data to monitor for fraud or loss, such as for inventory theft.

Figure 4:
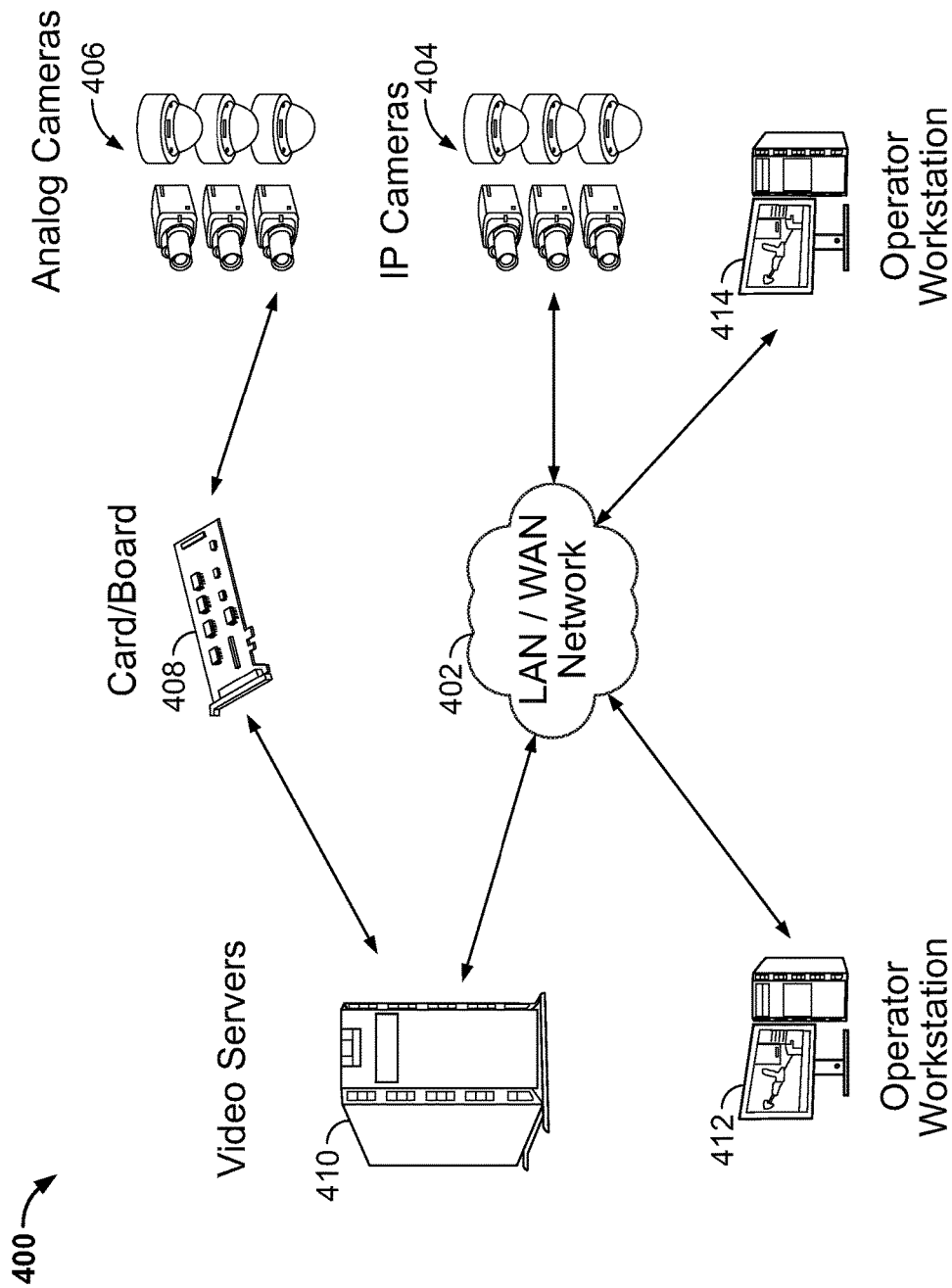
FIG. 4 shows a schematic view of an embodiment of a fourth network topology according to the present disclosure.

FIG. 4 shows a schematic view of an embodiment of a fourth network topology according to the present disclosure. A network topology 400 is configured similar to the topology 100, such as via an inclusion of a network 402, which is similar to the network 102, a set of Digital/Analog cameras 404, 406 which is similar to the cameras 104, a video server 410, which is similar to the server 112, and a set of operator workstations 412, 414, which are similar to the workstation 122. Note that the cameras 406 are not coupled to the network 402, yet the cameras 404 are coupled to the network 402.

The topology 400 comprises a card/board 408, which may comprise a graphics card/board or a TV tuner card/board. The card/board 408 may be built-in into the cameras 406 or the server 410 or a computer intermediate to the cameras 406 and the server 410, whether or not this computer is communicably coupled to the network 402. The topology 400 is configured to enable a plug and play installation, remote view capabilities, basic user rights permissions, macro command and time schedule engine, and a host of event reaction capabilities. As provided via the workstations 412, 414, a GUI can enable access to images captured via the cameras 404, 406, whether directly, such as from the cameras 404, or indirectly, such as from the cameras 404, 406 via the server 410. In some embodiments, such configuration can be set up and running in minutes, such as under sixty minutes.

In one mode of operation, the cameras 404, 406 feed imagery data to the server 410 through the card/board 408 and over the network 402, such as in parallel. The server 410 processes the imagery data, as disclosed herein, such as for facial recognition processing. The workstations 412, 414 access the server 410 over the network 402 to view the imagery data, as processed, or raw.

Figure 5:
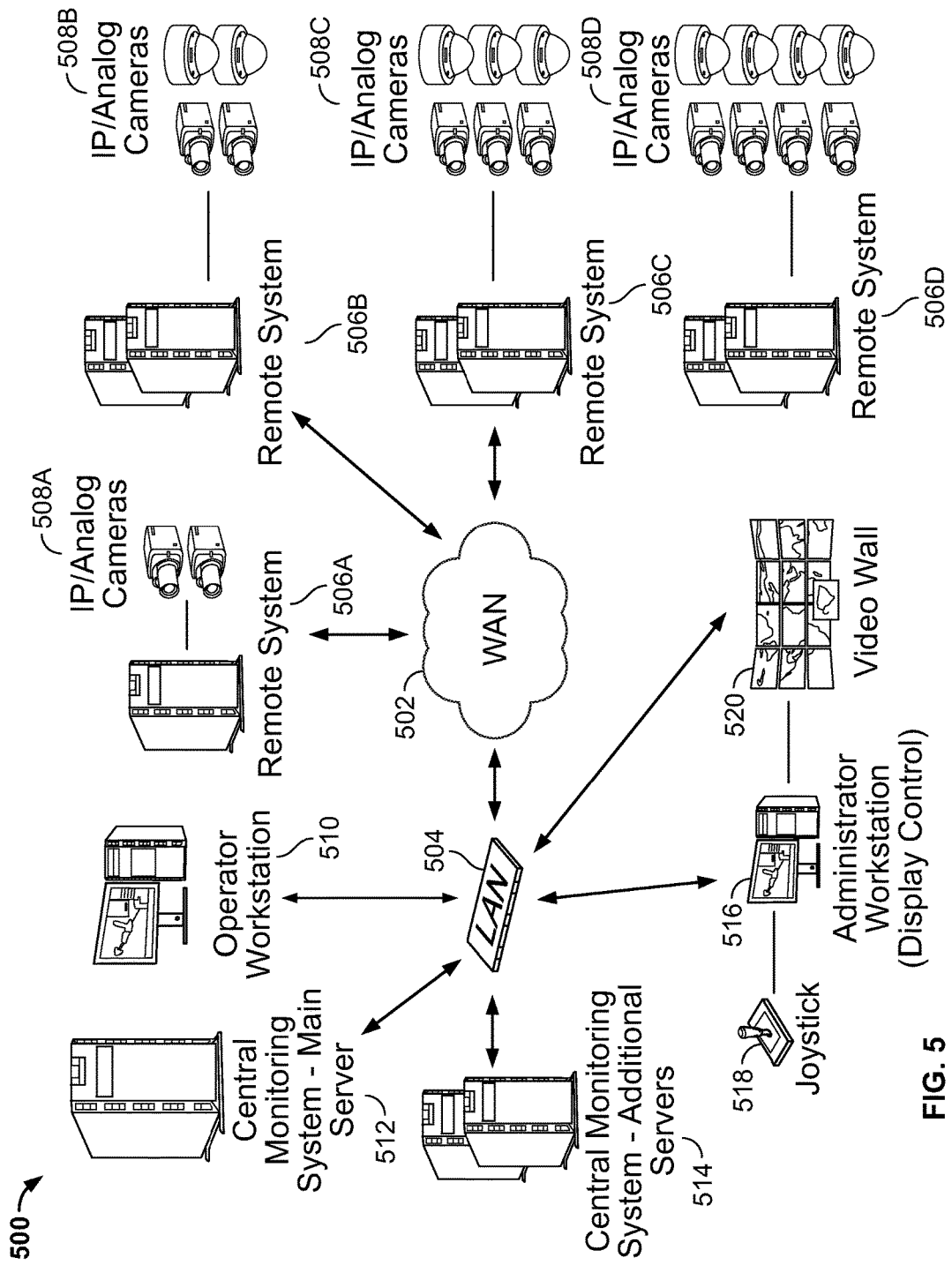
FIG. 5 shows a schematic view of an embodiment of a fifth network topology according to the present disclosure.

FIG. 5 shows a schematic view of an embodiment of a fifth network topology according to the present disclosure. A network topology 500 is configured similar to the topology 100, such as via an inclusion of a WAN 502, which is similar to the network 102, a set of Digital/Analog cameras 508 A, B, C, D, each of which is similar to the cameras 104, an operator workstation 510, which is similar to the workstation 122, a server 512, which is similar to the server 112, a server 514, which is similar to the server 114, an administrator workstation 516, which is similar to the workstation 116, a joystick 518, which is similar to the joystick 118, and a video wall 520, which is similar to the video wall 120.

The topology 500 comprises a set of remote systems 506 A, B, C, D, each of which is communicably interposed between the cameras 508 A, B, C, D and the WAN 502, respectively. Each of the systems 506 A, B, C, D comprises a server configured to communicably interface with the WAN 502 and each of the cameras 508 A, B, C, D, respectively. Such interfacing can comprise sending data to or receiving data from each of the cameras 508 A, B, C, D, such as for image recordation, image analytics, camera control, or other functionalities, as disclosed herein. For example, each of the systems 506 A, B, C, D and each of the cameras 508 A, B, C, D, respectively, can correspond to a different location or area under surveillance.

The topology 500 comprises a network device 504, such as a switch, a modem, or a router, which provides a LAN for the workstation 510, the server 512, the server 514, the workstation 516, and the video wall 520. The device 504 is in signal communication with the WAN 502.

In some embodiments, the topology 500 can be used as a monitoring and control center (MCC) which aggregates geographically diverse sites into a centralized and integrated command and control infrastructure. For example, one or more central management stations, such as the workstation 510 or the workstation 516, can receive, display, record video and manage events as well as all video analytics modules and externally integrated systems. For example, the MCC can allow for an integrated monitoring and management of a complete global security infrastructure from a single command center, such as for a customer with multiple sites and different classes of surveillance configurations at the different sites, as disclosed herein. The MCC allows for a federation of remote independent sites as if such sites were part of a single virtual system. This federation option allows for a streamlined workflow and globalizes security operations to make security personnel more productive and better informed. This federation capability may scale as needed to tie together a few sites to hundreds and thousands of globally disparate sites, and provides management of most or all servers within a virtual network and a visualization of most or all cameras and other devices, which are connected to each individual surveillance deployment. This federation may standardize security procedures as well as automated alarms and actions across an organizations' complete security infrastructure.

In one mode of operation, an administrator is situated in an MCC, operating the workstation 516, controlling the cameras 508 A, B, C, D, whether on an individual or group basis, through the joystick 518 via the LAN 504 over the WAN 502, and instructing the cameras 104 to initiate capturing of a plurality of images, such as via pressing a button on the joystick 518. The cameras 508 A, B, C, D capture the images and send the images to the remote systems 506 A, B, C, D, which in turn store the images and process the images, as disclosed herein, such as for cargo container identification. The server 512, and optionally server 514, access the images in the remote systems 506 A, B, C, D via the LAN 504 over the WAN 502 and feed the images to the video wall 520, the workstation 516, or the workstation 510. The remote systems 506 A, B, C, D can automatically send a message over the WAN 502 via the LAN 504 to at least one of the workstation 510 or the workstation 516 based on detecting a pattern in at least one of the images, as disclosed herein.

Figure 6:
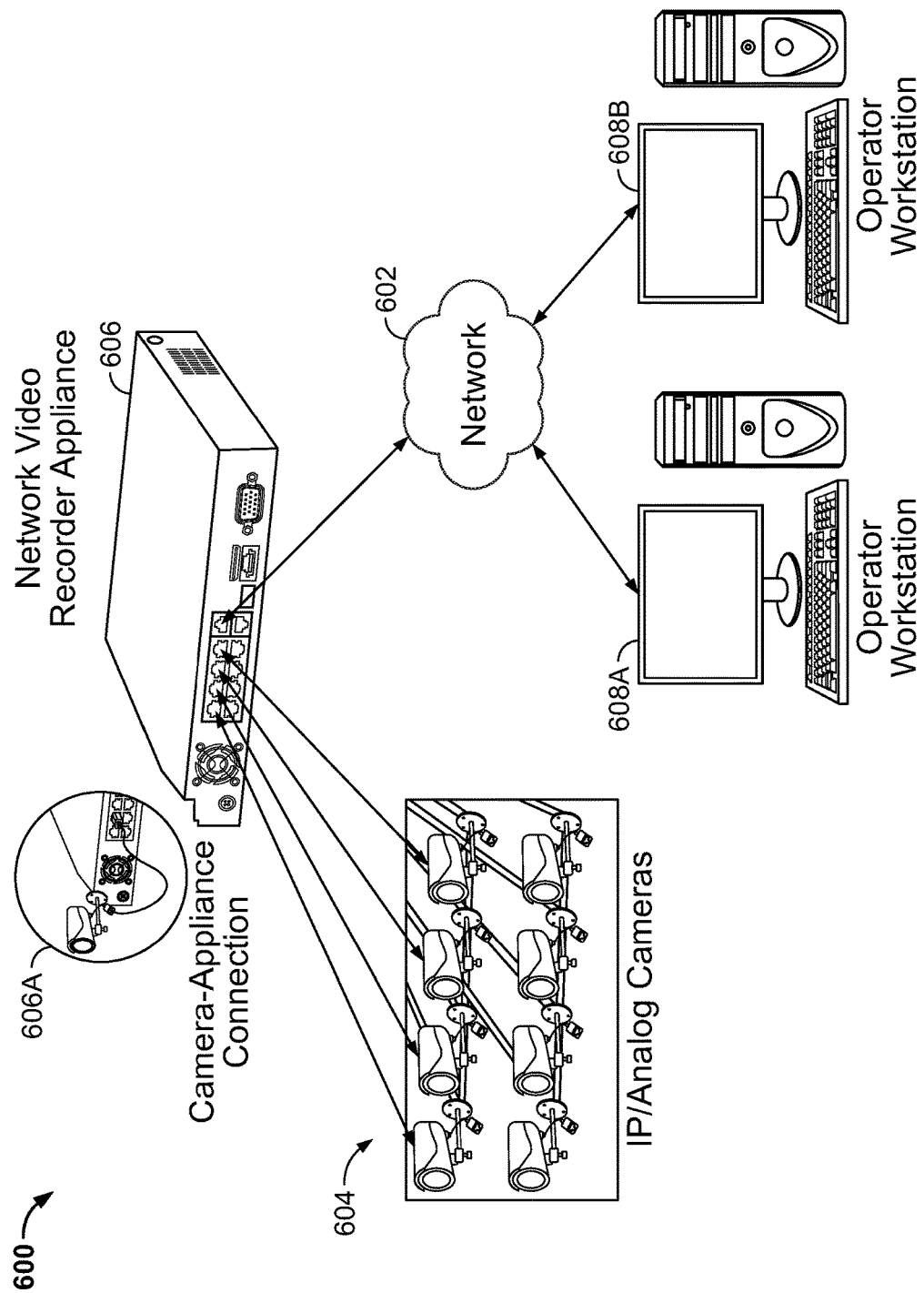
FIG. 6 shows a schematic view of an embodiment of a sixth network topology according to the present disclosure.
Figure 7A:
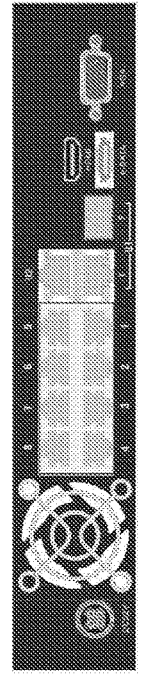
FIGS. 7A-7D show a plurality of schematic views of a plurality of embodiments of a plurality network video recorder appliances sides according to the present disclosure.
Figure 7B:
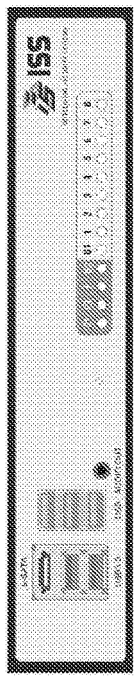
Figure 7C:
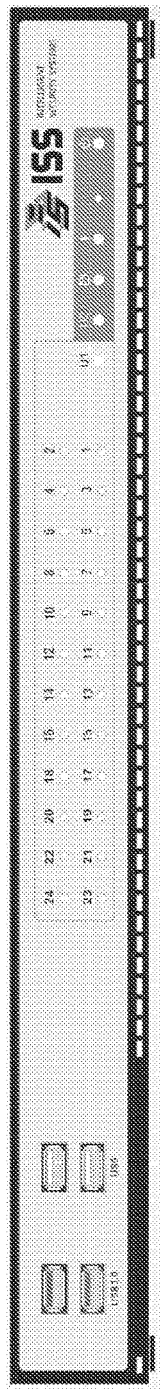
Figure 7D:
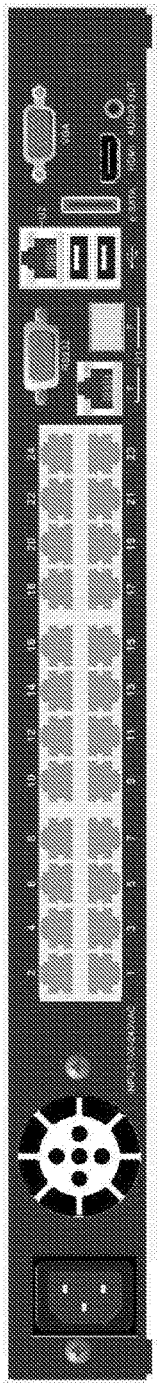

FIG. 6 shows a schematic view of an embodiment of a sixth network topology according to the present disclosure.

FIGS. 7A-7D show a plurality of schematic views of a plurality of embodiments of a plurality network video recorder appliances according to the present disclosure. A network topology 600 is configured similar to the topology 100, such as via an inclusion of a network 602, which is similar to the network 102, a set of Digital/Analog cameras 604, which is similar to the cameras 104, and a set of operator workstations 608A, 608B, each of which is similar to the workstation 122.

The topology 600 comprises a video recorder appliance 606, which is coupled to the cameras 604, such as signally, physically, or electrically, whether directly or indirectly, whether in a wired or wireless manner. For example, the cameras 604 can be coupled to the appliance 606, which can record images from the cameras 604 or send the images or avail the images to the workstations 608A, 608B over the network 602. As noted via a close-up 606A, at least one of the cameras 604 can plug into the appliance 606 via a cable. The appliance 606 is coupled to the network 602, whether directly or indirectly, whether in a wired or wireless manner. The appliance 606 can be wall-mounted or rack-mounted.

The appliance 606 can be scalable from small to large installations. The appliance 606 can include an Intel® architecture with an embedded Layer-2 Smart and Managed POE Switch. The appliance 606 can be configured to support logic, whether hardware-based or software-based, such as a module, configured to enable license plate recognition, container recognition, face capture and recognition, cargo recognition, traffic recognition, object recognition, object tracking, or any other image processing functionalities disclosed herein. The appliance 606 can connect the cameras 604 to a server, as disclosed herein, which can reduce and in some cases can eliminate video streaming on existing operator networks and lessens an amount of wiring and point of failures on this configuration. For example, the appliance 606 can comprise an embedded PoE (802.3at) switch, a gigabit uplink port, a 16 or 32 or 64 terabyte internal recording, a redundant array of independent disk (RAID) memory, a simultaneous playback/record/view logic, a pre and post alarm recording logic, a motion masking capability logic, a multi-layer mapping logic, an audio and video synchronization logic, an export logic for export into JPEG/portable network graphics (PNG), AVI, or native (encrypted) formats, a mobile app support logic. For example, the appliance 606 can run an embedded OS and comprise a managed switch functionality, such as via a network GUI.

The appliance 600 can comprise various front or back sides 700 A, B, C, D, which comprise plates structured to provide for fan outputs/heat sink, network cabling, camera cabling, light sources indicative of operably coupled cameras 604, appliance power/network status, and various ports, such as audio jack, power cable, high definition multimedia interface (HDMI), video graphics array (VGA) universal serial bus (USB), Serial AT Attachment (SATA), or other bus interfaces.

In one mode of operation, operators operating the workstations 608A, 608B access the appliance 606 over the network 602, such as in parallel. The appliance 606 is coupled to the cameras 604 such that the appliance 606 receives captured images, such as video, from the cameras 604 and records the captured images, such as onto internal memory or NAS, for access by the workstations 608A, 608B. The appliance 606 can perform image processing techniques, as disclosed herein, on the captured images automatically, such as upon receipt of the captured images from the cameras 604 or another triggered condition, or upon request from at least one of the workstations 608A, 608B, as received over the network 602.

Figure 8A:
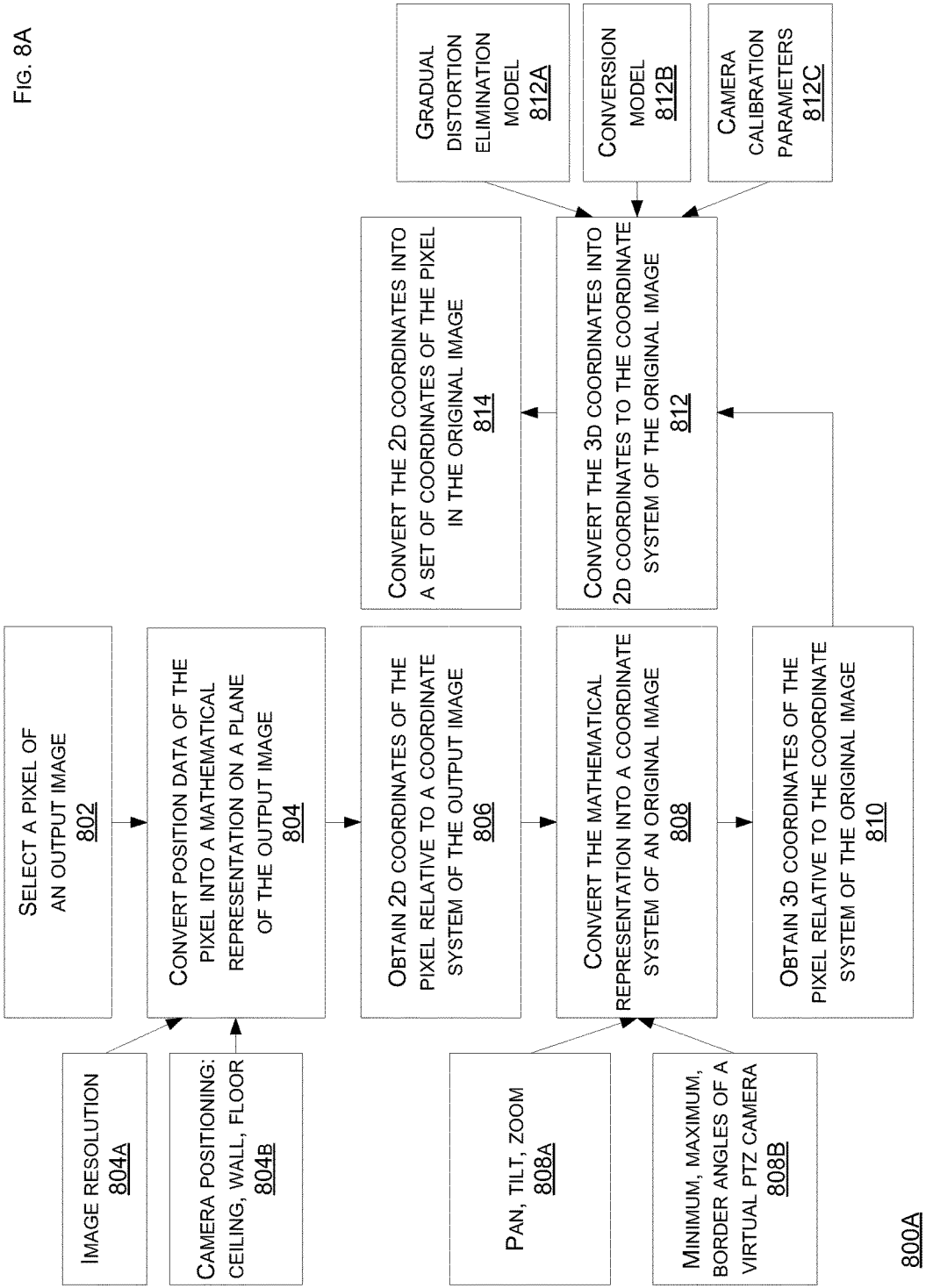
FIG. 8A shows a flowchart of an embodiment of a process of image processing according to the present disclosure.

FIG. 8A shows a flowchart of an embodiment of a process of image processing according to the present disclosure. A process 800A includes a plurality of blocks 802-814, which are used by a computer to enable a conversion of a plurality of coordinates of a pixel of an output image into a plurality of coordinates of a pixel in an original image captured via a camera comprising a wide-angle camera lens. For example, the original image can comprise a source image. The process 800A is performed via any computer architectures, as disclosed herein, such as at least one of the topology 100, 200, 300, 400, 500, or 600. In some embodiments, the process 800A is distributed over a plurality of computers or topologies, as disclosed herein. As shown in FIG. 8A, a transformation algorithm for a single pixel of an output image is disclosed, where on an input there is available a set of coordinates (u, v) of the single pixel on the output image, and where on an output there is available a set of coordinates ($u_f$, $v_f$) of the single pixel on an original image, and where the set of coordinates ($u_f$, $v_f$) are inserted into a cell of a transformation map (a look-up table), and where the cell stores a set of data for the single pixel (u, v). In some embodiments, a term "a conversion map" may be equivalent to a term "a look-up table." A full conversion map represents a two-dimensional grid of cells, whose size equals a size of the output image. A pixel of the output image (i, j) corresponds to a cell of a full conversion map (i, j) which stores coordinates of a certain pixel of an input image ($u_f$, $v_f$). The full conversion map is similar or equal to a conversion map (a table of cells) created for a full mesh or grid of pixels. A partial conversion map is a two-dimensional grid of cells whose size equals to a size of the output image divided by a coefficient of sparsity $k_{sp}$. That is, a horizontal size and a vertical size of the sparse conversion map is equal, respectively, to a horizontal size and a vertical size of the output image divided by the coefficient of sparsity $k_{sp}$. Each cell in the sparse conversion map stores coordinates of a certain pixel of the input image ($u_f$, $v_f$). The partial (sparse) conversion map is similar or equal to a conversion map (a table of cells) created for a sparse mesh or grid of pixels. Therefore, FIG. 8A shows a sequence of conversion for a single pixel of the output image. Such determinations are performed for each cell of a sparse conversion map. However, note that each cell of such table corresponds to a certain pixel of the output image, hence, the present disclosure discloses the determinations per pixel of the output image. The process 800A can enable real-time conversion of images captured via a camera comprising a wide-angle camera lens, such as via gradual reductions of image distortions introduced by a wide-angle lens. For example, a degree of elimination of distortion can vary gradually so that a minimal degree of elimination of the distortion corresponds to an original image, and a maximum degree corresponds to a rectilinear image. The process 800A can be performed in real-time, such as based on an approach employing a use of a partial mesh of pixels, such as a sparse mesh. In some embodiments, the process 800A is applied not to each pixel of an output image, but rather to a set of pixels located on an original pixel grid, such as with a certain pitch, for example, four increments. After receiving a look-up table for a partial grid of pixels, most or all of missing values can be computed using interpolation. For example, the process 800A can be used to convert or transform one or more coordinates of a particular pixel of an output image into coordinates of a pixel in an original image of the camera comprising a wide-angle camera lens. A repetition or iteration of a sequence of the blocks 802-814 for each pixel from a partial mesh of pixels, such as a sparse mesh, may result in a formation of a first map of conversions or transformations for the partial grid of pixels. Then, using interpolation, a second map of conversions or transformations for full pixel grid may be formed. On a basis of the second map, an output image can be constructed from an input image of the camera comprising a wide-angle camera lens. Note that some parameters used in the blocks 802-814 may include pan, tilt, zoom or other parameters.

In a block 802, a pixel of an output image is selected. For example, a specific pixel in an output image is selected. This pixel is associated with a positional data, such as a set of coordinates, such as X, Y in a Cartesian plane system. For example, this pixel is described via a set of coordinates (u, v), where a u-value represents a horizontal axis, measured in pixels, and a v-value represents a vertical axis, measured in pixels.

In a block 804, the position data of the pixel of the output image is converted into a mathematical representation on a plane of the output image. The mathematical representation is based on an image resolution obtained via a block 804A, defined via a width W and a height H, as well as a position of a camera, such as a ceiling, a wall, or a floor, as obtained via a block 804B. The mathematical representation of a set of coordinates (Pu, Pv) may be determined via an equation $P_u = u - C_x$, $P_v = v - C_y$, where ($C_x$, $C_y$) are coordinates of a beginning of a 2d coordinate system on a plane of an output image. The beginning of the 2D coordinate system on the plane of the output image may be selected at a point of an intersection of the plane and an optical axis of a lens. At this stage, a camera position may be considered (ceiling, wall, floor). For example, if the camera is positioned on the floor, then a set of values $P_u$, и $P_v$ may be determined by an equation $P_u = -(u - C_x)$, $P_v = -(v - C_y)$.

A virtual PTZ camera can be formed using a camera with a wide-angle lens, where the virtual PTZ camera lacks moving parts, yet the virtual PTZ camera can perform image conversion via logic, whether hardware-based or software-based, such as a software application, a module, a function, or others. The virtual PTZ camera may include a description with a set of parameters, such as a maximum viewing angle value, a minimum viewing angle value, a border view angle value, a pixel size of an output image value (vertically and horizontally), a pan value, a tilt value, or a zoom value.

Angle values of panning and tilting set a direction (vector) of a line of sight of the virtual PTZ camera and the zoom value determine a degree of a nearness approximation, that is, a desired magnification of the output image. The zoom value may be changed from 0 to 1, where 0 represents a lowest degree of the nearness approximation, and 1 represents a maximum degree of the nearness approximation. The zoom value is associated with a virtual PTZ camera viewing angle value. When the zoom value changes, then the virtual PTZ camera viewing angle changes. For example, when the zoom value is 0, then the virtual PTZ camera viewing angle is maximum and vice versa. Note that an order of determining a pan angle and a tilt angle can vary in different camera installation configurations (ceiling, wall, floor).

A description of an image plane may include a set of parameters, such as a vector which is normal to the image plane and which is coincident to a vector line of sight of the PTZ camera and a distance from a beginning of a coordinate system to a plane of an output image.

A description of a position of a camera (ceiling, wall, floor) includes a predominant (approximate) orientation of an optical axis of a wide angle lens of a camera relative to a local vertical. For example, the ceiling description describes an optical axis of a camera is directed opposite to a line of a local vertical. For example, the wall description describes an optical axis of a camera is directed perpendicular to a line of a local vertical. For example, the floor description describes an optical axis of a camera is directed along a line of a local vertical, such as parallel thereto.

In a block 806, 2d coordinates of the pixel relative to a coordinate system of the output image are obtained. Therefore, in the block 806, a certain point P on a plane of an output image receives a description $P=(P_u, P_v)$.

Figure 9:
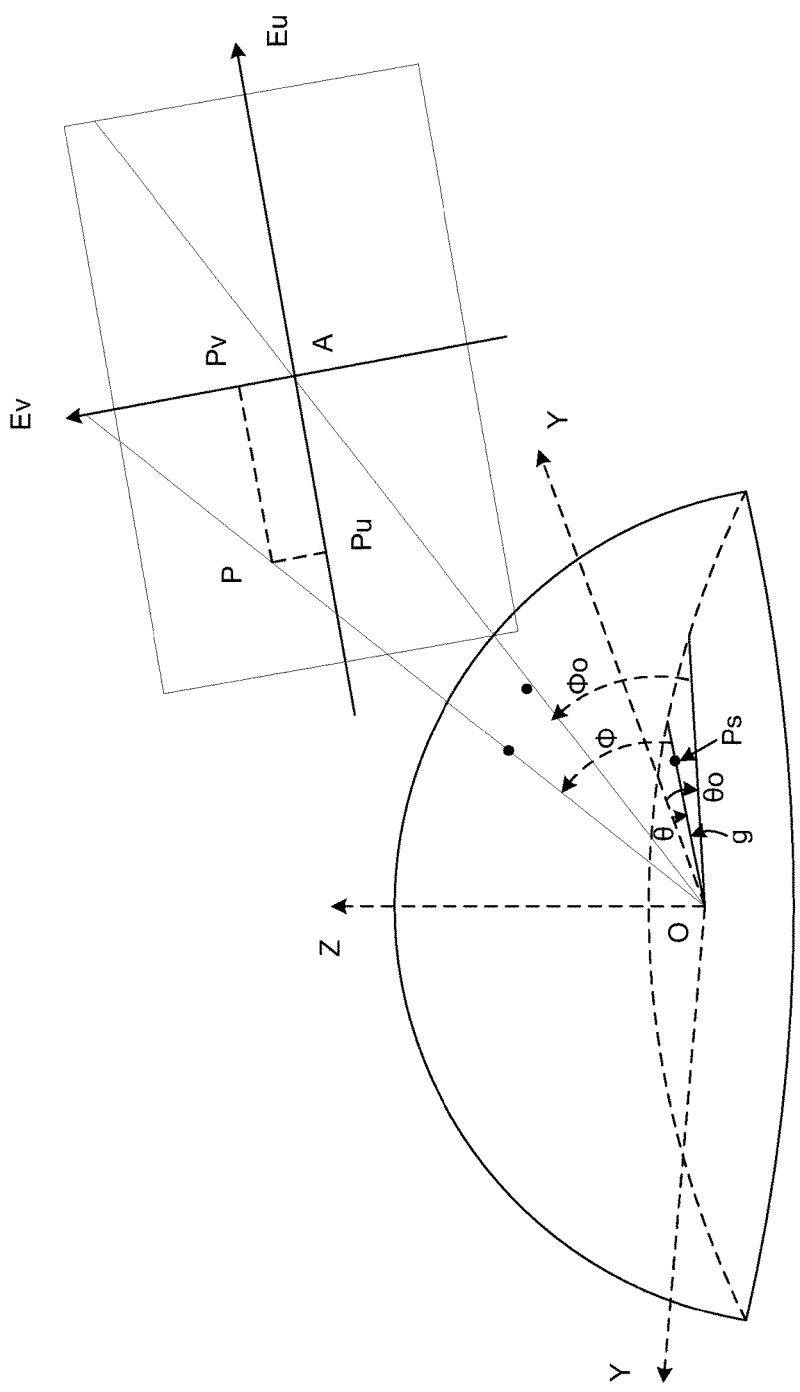
FIG. 9 shows a diagram of an embodiment of a mathematical representation of a system of coordinates associated with an original image according to the present disclosure.

In a block 808, the mathematical representation is converted into a coordinate system of an original image. This conversion employs various camera parameters, such as pan, tilt, and zoom via a block 808A, which determine a position of the plane of the output image in the coordinate system of the original image, and minimum, maximum, and border angles of a virtual PTZ camera, as obtained via a block 808B. At this stage, for the point $P=(P_u, P_v)$, a set of coordinates $P_x$, $P_y$, $P^z$ is determined in a system of coordinates associated with the input image. For example, as shown in FIG. 9, such system of coordinates is XYZ system. Initially, a computerized determination determines at what distance from a coordinates origin should a plane of the output image be placed. Thus, according to FIG. 12, a minimum zoom value=0 corresponds to a maximum viewing angle and a maximum zoom value=1 corresponds to a maximum viewing angle of a virtual PTZ camera. Therefore, the zoom value received from the block 808A can be converted directly into a degree measure $$zoom_d = ang_{max} - zoom \cdot (ang_{max} - ang_{min})$$

where $zoom_d$—is a zoom value, converted into the degree measure, that is, a magnitude of a corresponding angle of the virtual PTZ camera; $ang_{max}$—is a maximum viewing angle of the PTZ camera; $ang_{min}$—is a minimum viewing angle of the virtual PTZ camera. A distance (in pixels) to the plane of the output image, where the output image having a horizontal size of W pixels, is visible under an angle of $zoom_d$, can be defined as follows $$F_p = \frac{W}{2 \cdot tg(zoom_d)}.$$

As shown in FIG. 9, a set of coordinates $P_x$, $P_y$, $P_z$ depends from a position of the plane of the output image, which is determined by an orientation of a line of sight of the virtual PTZ camera from a point O to a point A. An orientation of a vector OA is determined by angles $\theta_0$ и $\phi_0$, which are determined by values of parameters pan and tilt from the block 808A. For example, $$P_x = (F_p \cos \phi_0 - P_v \sin \phi_0) \cdot \cos \theta_0 + P_u \cdot \sin \theta_0;$$

$$P_y = (F_p \cos \phi_0 - P_v \sin \phi_0) \cdot \sin \theta_0 + P_u \cdot \cos \theta_0;$$

$$P_z = F_p \cdot \sin \phi_0 + P_v \cdot \cos \phi_0$$

In a block 810, 3d coordinates of the pixel relative to the coordinate system of the original image are obtained. Therefore, the block 810 a certain point P on a plane of the output image receives a description in a form $M=(P_x, P_y, P_z)$.

In a block 812, the 3d coordinates of the original image are converted into 2d coordinates of the original image. This conversion is performed in accordance with the a model of eliminating or reducing distortion, such as to eliminate or reduce distortion introduced via a wide-angle lens, as obtained via a block 812A, a model of conversion, such as specific to a specific camera model, as obtained via a block 812B, and a set of one or more camera calibration parameters, as obtained via a block 812C, which are specific to specific camera models, as predetermined. Note that for the model of eliminating or reducing distortion, a computer calculates of a degree of elimination or reduction of distortion based on or via a mapping of a plurality of zoom values onto a plurality of values corresponding to a plurality of degrees of distortion elimination or reduction. This action comprises assigning or specifying the zoom values and the degree values to a value in a range or an interval [0;1]. The action also comprises assigning or specifying a boundary value or a threshold value, such as zoom_border. Note that the zoom values within the range or the interval [0; zoom_border] are mapped onto the degree values in a range or an interval [0;1]. The zoom values within the range or the interval [zoom_border;1] are mapped into the degree values equal to 1. Further, note that the block 812A is used for determining a value of a coefficient of elimination of distortion $k_e$ (Distortion Elimination Factor) based on a zoom value.

A description of a model of a camera (a transformation model or a model of conversion of the block 812B) may include a mathematical model $\rho=F(\gamma)$, which enables, based on an angle value $\gamma=90-\phi$ between an optical axis of a camera and a direction to a point in a space P, a determination of a distance $\rho$ between a principal point O and a point $P_s$ on a plane of an original image. Point $P_s$—represents an image of a point in a space P on an image captured via a wide-angle lens of a camera. Note that the angle $\phi$ and the points P, O, $P_s$, and the distance $\rho$ are shown in FIG. 9.

A transformation F can be selected from a plurality of models, such as an equidistant model, a stereographic model, an equi-solid-angle model, an orthogonal model, or other models. Additionally, the transformation F can include a polynomial transformation. A set of parameters for such transformation are specific to various models of wide-angle lens cameras. Any of above mentioned parameters are determined during a camera calibration process (calibrating parameters). One example of a polynomial model is a Scaramuzza model, which may be represented as m=world2cam(M, ocam_model). With use of such model, a transformation may be performed, where such transformation transforms a vector of coordinates M=(X,Y,Z) into coordinates $m=(u_f, v_f)$ point, positioned in an image captured via a wide-angle lens camera. Note that during such transformation, one or more calibrating parameters (ocam_model) of a camera are used. Also, note that in abovementioned transformation, a vector of coordinates M=(X,Y,Z) corresponds not to some single 3D point, but any 3D point laying in this 3D vector. In the Scaramuzza model, a transformation may be represented as $$P = \begin{bmatrix} X \\ Y \\ Z \end{bmatrix} = \begin{bmatrix} u_f \\ v_f \\ f(\rho) \end{bmatrix}, \text{ where } \rho = \sqrt{u_f^2 + v_f^2}.$$

Function $f(\rho)$ is a polynomial function, coefficients of which are calibrating parameters of a wide-angle lens camera and are determined during a calibration process. Function $f(\rho)$ may be represented as $$f(\rho) = a_0 + a_1\rho + a_2\rho^2 + a_2\rho^3 + a_4\rho^4 + \ldots$$

Therefore, one or more calibrating parameters, which should be determined during a calibration process include $a_0, a_1, a_2, a_3, a_4, \ldots$ A coefficient $k_e$ (distortion elimination factor) is input into a polynomial model, $$f(\rho) = \frac{1}{a_0 + (1-a_0)k_e}\lceil a_0 + k_e(\alpha_1\rho + \alpha_2\rho^2 + \alpha_3\rho^3 + \alpha_4\rho^4 + \cdots)\rceil$$

The coefficient $k_e$ has an influence on a distortion, which is introduced via a wide-angle lens camera, wherein the influence may vary based on a value of the coefficient. For example, if the coefficient $k_e$ has a value equal to zero, then the distrotion is not eliminated. For example, if the coefficient $k_e$ has a value equal to one, then the distortion is eliminated fully. For example, if the coefficient $k_e$ has a value greater than zero and lesser than one, then the distortion is eliminated partially.

In a block 814, the 2d coordinates of the original image are converted into a set of coordinates of the pixel in the original image.

FIG. 8B shows a flowchart of an embodiment of a process for determining a full transformation map (look-up table) according to the present disclosure. A process 800B includes a plurality of blocks 816-820. The process 800B is performed via any computer architectures, as disclosed herein, such as at least one of the topology 100, 200, 300, 400, 500, or 600. In some embodiments, the process 800B is distributed over a plurality of computers or topologies, as disclosed herein. The full transformation map (look-up table) is desired for performing a non-linear mapping of an input image captured via a wide-angle lens camera into an output image. This mapping comprises a table of size W, H, which is equal in size to the output image. In a cell, which has a set of coordinates (u, v) and corresponding to a point P, as shown in FIG. 9, there is contained a set of coordinates of a corresponding point $(u_f, v_f)$ of an original image. Note that the transformation map (look-up table) is obtained gradually or in phases, where initially a partial transformation map, such as sparse, is determined and then a full transformation map is determined, where the full transformation map is determined based on an interpolation process.

In a block 816, a computer obtains a set of coordinates of a pixel in an original image for each pixel from a partial mesh of pixels.

In a block 818, the computer builds a conversion map (look-up table) for a partial, such as sparse, grid of pixels. After the blocks 802-814 are performed for most or all pixels in the partial grid of pixels, a conversion or transformation map can be built, where such conversion or transformation map corresponds to the partial grid of pixels.

In a block 820, the computer builds a conversion map (look-up table) for a full grid of pixels is built via an interpolation process. After the block 818, such as using the map from the block 816, via the interpolation process, a conversion or transformation map can be built, where such conversion or transformation map corresponds to the full grid of pixels. The interpolation process can comprise at least one of neighbor interpolation, bilinear interpolation, or bi-cubic interpolation. The partial transformation map has a size $(W_s, H_s)$, which is less than the full transformation map (W, H). In order to determine $(W_s, H_s)$, a sparsity coefficient (sparsity factor) $k_s$. A use of the sparsity coefficient enables an increase in an efficiency of computing. As disclosed herein, a method of determining a sparsity coefficient based on a search of a balance between a method performance and a quality of an image. The method performance can be determined, for example, based on a number of frames processed per second. The quality of the image can be determined, for example, based on a use of a characteristic, such as a peak signal-to-noise ratio or a mean squared error.

FIG. 9 shows a diagram of an embodiment of a mathematical representation of a system of coordinates associated with an original image according to the present disclosure. As shown in a diagram 900, a system of coordinates of an original image is represented by an origin point O and a set of axes X, Y, Z. The axis X and the axis Y are set such that the axis X and the axis Y are parallel, respectively, to a horizontal axis and a vertical axis of the original image. The axis Z is collinear to an optical axis of a camera comprising a wide-angle lens. A hemisphere, with a single radius, is centered at the origin point O. Such representation enables a conversion of 3d coordinates of a point on a single sphere into 2d coordinates on a plane XOY and then into pixel coordinates on an original image. Also, the diagram 900 depicts an arbitrary point A and a line of sight OA of a virtual PTZ camera and a plane of an output image, where such plane is perpendicular to the line of sight OA. Note that angles $\theta_0$ and $\phi_0$ characterize an orientation of a line of sight of a virtual PTZ camera in a system of coordinates associated with an input image. Also, note that angles $\theta$ and $\phi$ characterize an orientation towards a point P located on a plane of an output image. Further, note that a plane of an output image is described via a vector of a line of sight (vector from a point O to a point A) and a distance from a point O to a point A. Additionally, note that point $P_s$ on a plane of an original image is an image of a point P, where a distance from a point O to point $P_s$ is represented as $\rho$.

Figure 10:
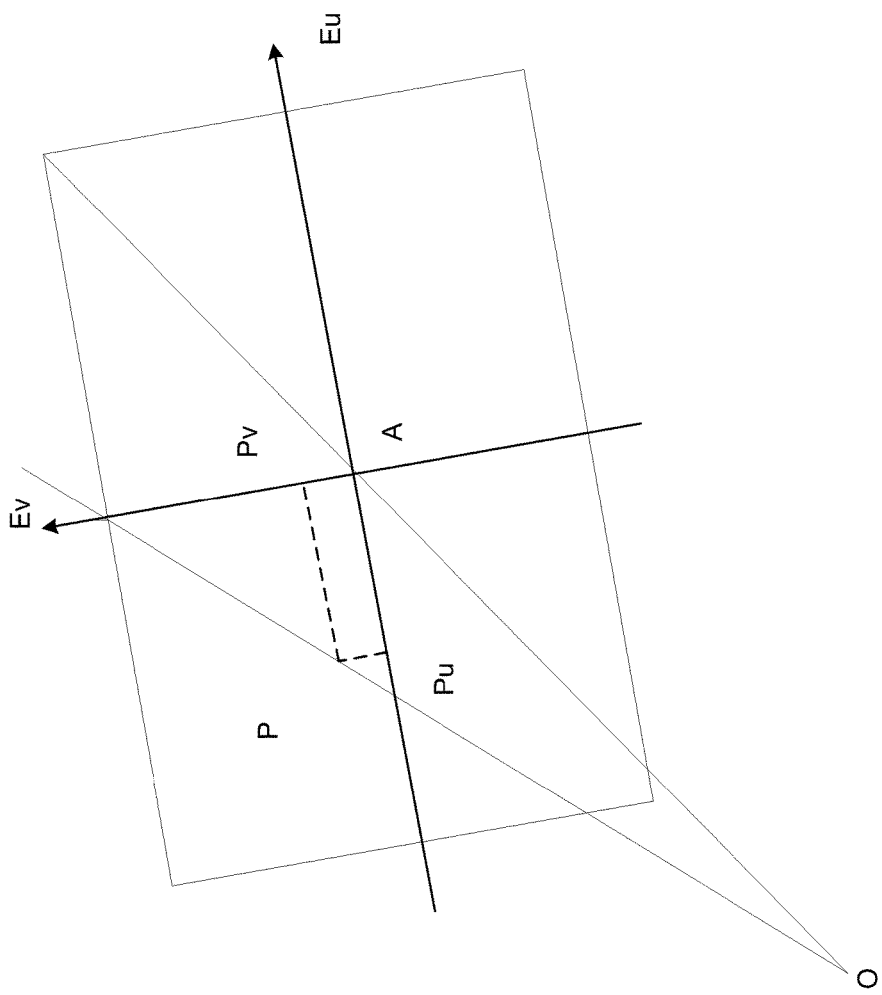
FIG. 10 shows a diagram of an embodiment of a plane of an output image according to the present disclosure.

FIG. 10 shows a diagram of an embodiment of a plane of an output image according to the present disclosure. As shown in a diagram 1000, an output image, which is formed via the process 800A, is disposed on a plane of an output image. A position of this plane in a space is defined via various values, such as pan, tilt, or zoom. This image plane is positioned at a preset distance from where zoom depending coordinates begin and a position normal to the image plane is determined by pan values and tilt values. Note that FIG. 9 depicts an arbitrary point P on a plane of an output image. A size of the output image (in pixels) may be equal to W, H, where W represents a width of the output image and H represents a height of the output image. A position of the arbitrary point P may be described via a set of pixel coordinates (u, v), where u represents a horizontal coordinate and v represents a vertical coordinate. Therefore, with a knowledge of a set of coordinates for a point A, which is a center $(C_X, C_Y)$ of an output image, then a determination can be made for a set of coordinates of a point P for an output image in a 2d system of coordinates via P_u=U–C_x, P_v=U–C_x.

Figure 11:
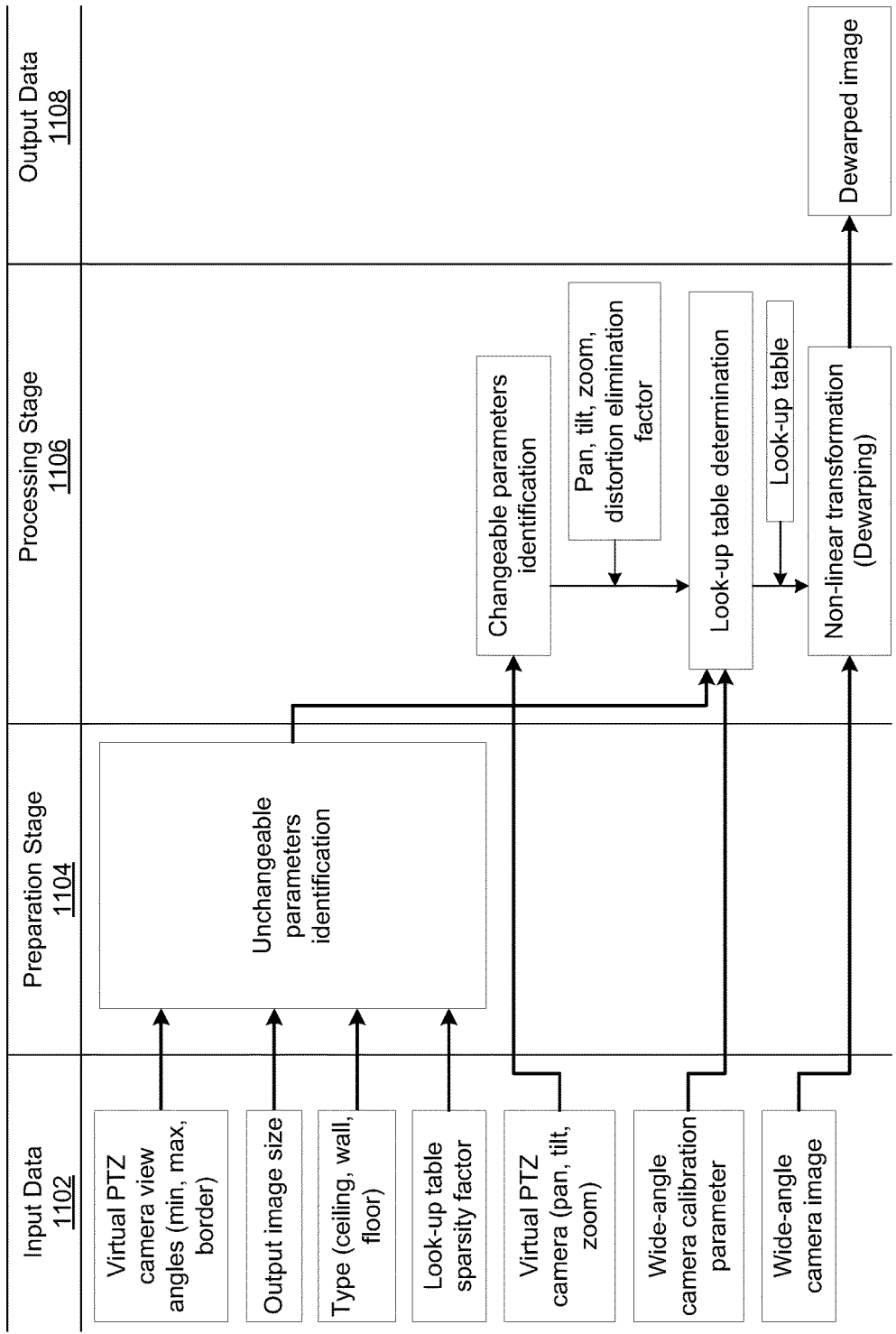
FIG. 11 shows a schematic diagram of an embodiment of a process of dewarping according to the present disclosure.

FIG. 11 shows a schematic diagram of an embodiment of a process of dewarping according to the present disclosure. A process 1100 includes a plurality of stages 1102-1108, such as an input data stage 1102, a preparation stage 1104, a processing stage 1106, and an output data stage 1108. The process 1100 is performed via any computer architectures, as disclosed herein, such as at least one of the topology 100, 200, 300, 400, 500, or 600. In some embodiments, the process 1100 is distributed over a plurality of computers or topologies, as disclosed herein. During the input data stage 1102, various data is gathered, as shown in the input data stage 1102 column. During the preparation stage 1104, in an off-line regime, various parameters are determined, such as virtual PTZ camera view angles (minimum, maximum, border), output image size, camera position (ceiling wall, floor), look-up table sparsity factor, or others. Note that such parameters do not change in the processing stage 1106. In the processing stage 1106, in a real-time regime, a distortion elimination factor $k_e$ is determined based on a zoom value. Then, a look-up table is determined based on the parameters determined during the preparation stage 1104, based on the parameters determined during the processing stage 1106, and based on a set of calibration parameters of a wide-angle camera. The look-up table is determined gradually or in phases, where initially a partial transformation map, such as sparse, is determined (on a sparse grid or mesh of pixels) and then an interpolation of the partial transformation map occurs and then a full transformation map is determined. Thereafter, a non-linear transformation (dewarping) of an input image of a wide-angle lens camera and a receipt of an output image.

Figure 12:
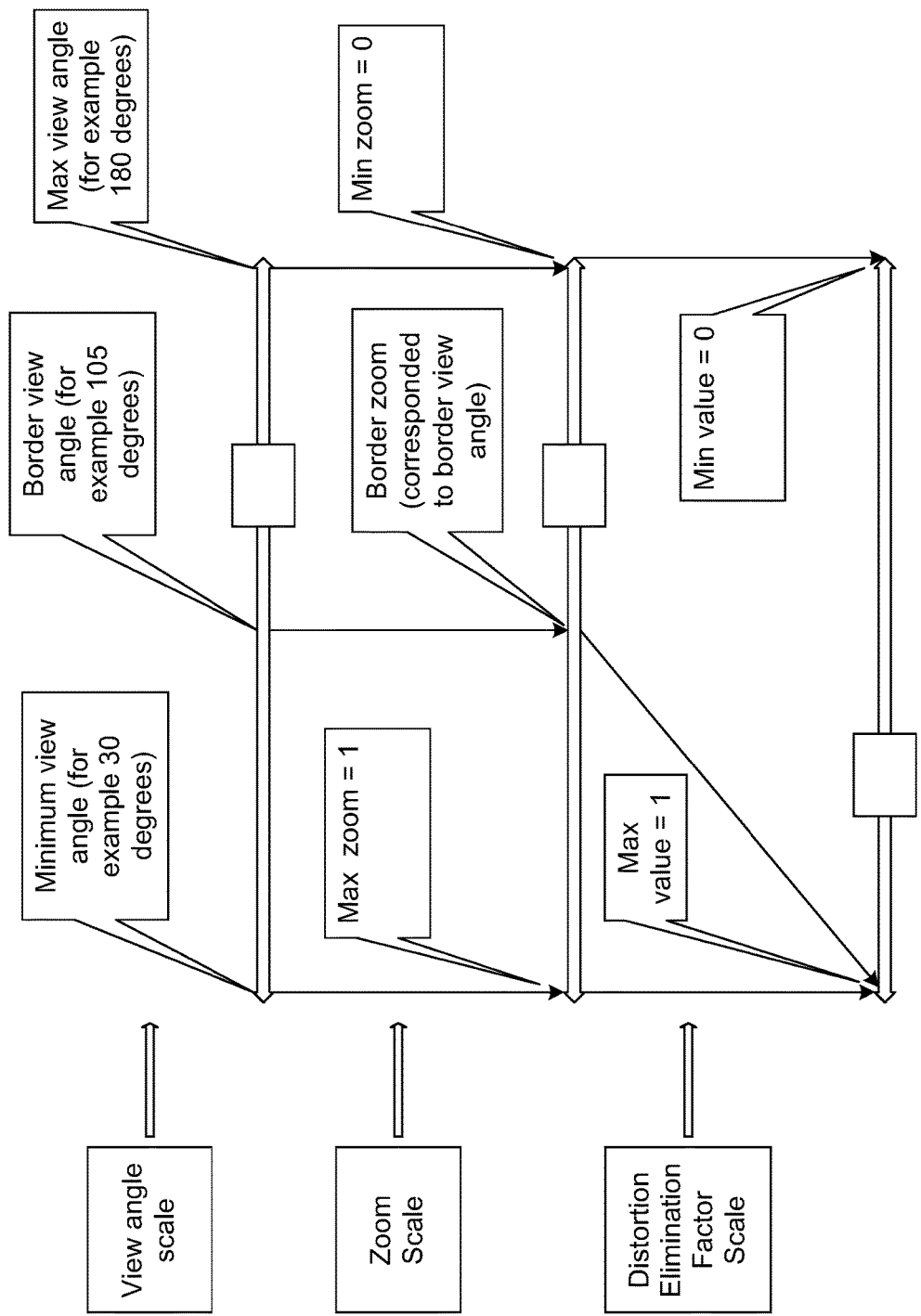
FIG. 12 shows a schematic diagram of an interconnection relationship between a viewing angle, a zoom value, and a distortion elimination factor according to the present disclosure.

FIG. 12 shows a schematic diagram of an interconnection relationship between a viewing angle, a zoom value, and a distortion elimination factor $k_e$ according to the present disclosure. Upon creation of a virtual PTZ camera, a set of settings is formed or set, such as a maximum viewing angle, such as about 180 degrees, a minimum viewing angle, such as about 30 degrees, a border viewing angle, such as about 105 degrees. As shown along a set of graphical sliding scales, the maximum viewing angle corresponds to a minimum zoom value, which may be equal to 0. The minimum viewing angle corresponds to a maximum zoom value, which may be equal to 1. The border viewing angle corresponds to a border zoom value, which may be equal to 0.5. The minimum zoom value corresponds to a minimum value of a distortion eliminator factor (coefficient), which may be equal to 0. The border zoom value corresponds to a maximum value of the distortion eliminator factor, which may be equal to 1. The maximum zoom value corresponds to the maximum value of the distortion eliminator factor, which may be equal to 1. Therefore, when a zoom scale is adjusted, such as when the zoom value is changed, such as via automatic or manual adjustment, in a range between the border zoom value (0.5) and the maximum zoom value (1), inclusively, then a viewing angle scale is changed, such as from the border view angle (105) to the minimum view angle (30). During such adjustment, the distortion elimination factor $k_e$ changes from 0 toward 1 in value, i.e., a distortion, which is introduced by a wide-angle lens, is fully eliminated and a rectilinear image is obtained. Likewise, when the zoom scale is adjusted, such as when the zoom value is changed, such as via automatic or manual adjustment, in a range between the minimum zoom value (0) and the border zoom value (0.5), inclusively, then the viewing angle scale is changed, such as from the maximum view angle (180) to the border view angle (105). During such adjustment, the distortion elimination factor $k_e$ changes from 0 toward 1 in value. Consequently, a method output may include an image on which a distortion, as introduced by a wide-angle camera lens, is gradually eliminated based on a zoom value. Such processing enables a compromise between a viewing angle size and a degree of distortion elimination.

Figure 13:
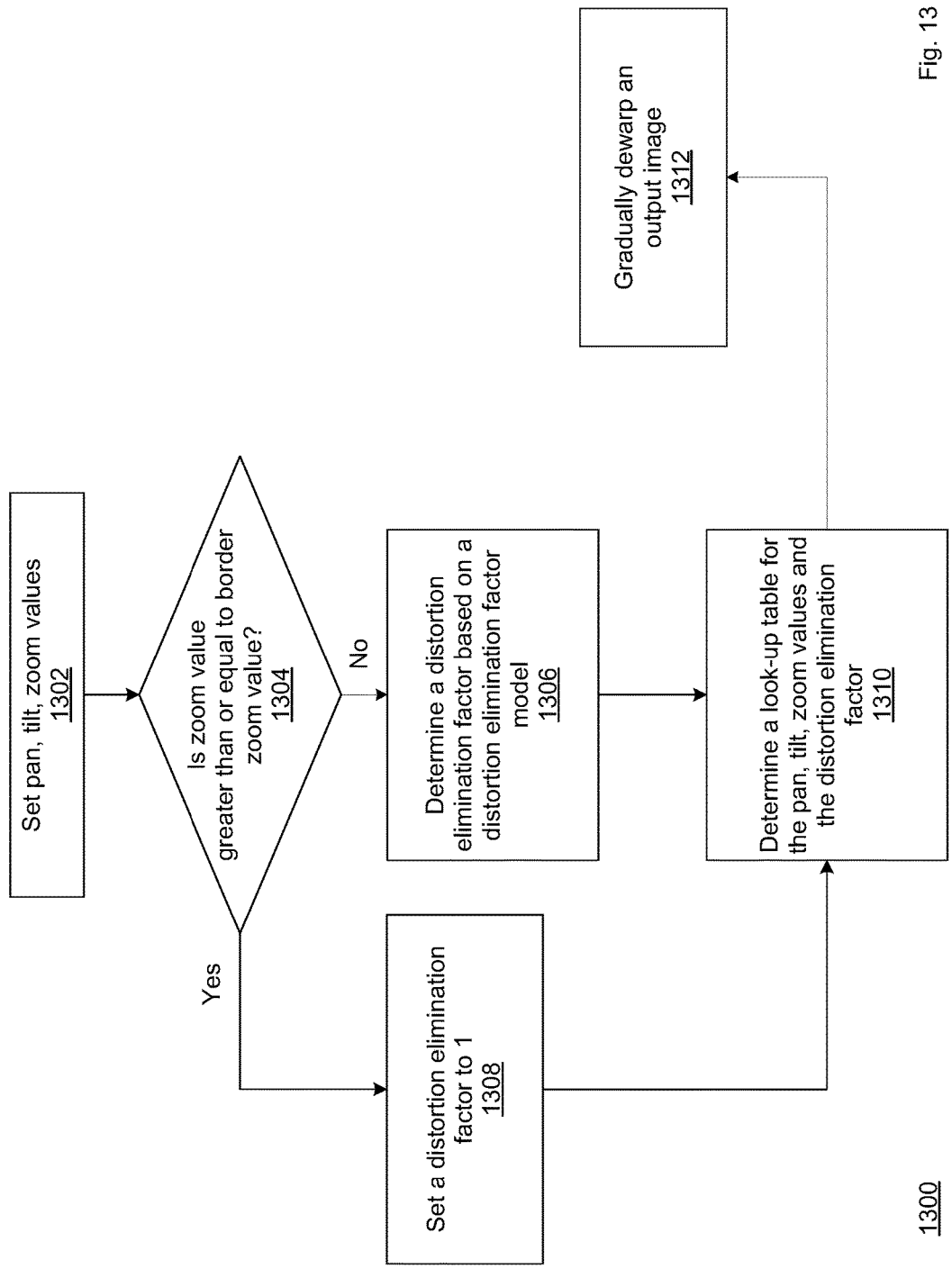
FIG. 13 shows a flowchart of a method of gradual dewarping of an image according to the present disclosure.

FIG. 13 shows a flowchart of a method of gradual dewarping of an image according to the present disclosure. A process 1300 includes a plurality of blocks 1302-1312. The process 1300 is performed via any computer architectures, as disclosed herein, such as at least one of the topology 100, 200, 300, 400, 500, or 600. In some embodiments, the process 1300 is distributed over a plurality of computers or topologies, as disclosed herein. The process 1300 enables a gradual removal of a distortion on an output image based on a zoom value and a distortion elimination factor $k_e$.

In a block 1302, a user sets a pan value, a tilt value, and a zoom value, whether in a single page of a graphical user interface or in a plurality of pages of a graphical user interface. Such setting may be via at least one of a button, an alphanumeric input, such as a textbox, a menu selection, such as a dropdown menu, or a gradual value selector, such as via a slider or a dial. In some embodiments, such setting may comprise speaking into a microphone, a touch gesture, or capturing a photo via a camera. The user may also set at least one of the pan value, the tilt value, or the zoom value in a first instance and then set or amend at least one of the pan value, the tilt value, or the zoom value in a second instance.

In a block 1304, a comparison is performed, where the comparison compares the zoom value and a border zoom value, as stored. If the zoom value is greater than or equal to the border value, then a block 1308 is performed, otherwise, a block 1306 is performed.

In a block 1306, a determination is performed, where the determination involves determining a distortion elimination factor value Ke based on a distortion elimination factor model, which may be set via an equation $Ke=Zoom_S/Zoom_B$ where Ke is a distortion elimination factor, $Zoom_S$ is a value as set by a user or via a program, and $Zoom_B$ is a border zoom value.

In a block 1308, a setting is performed, where a distortion elimination factor value is set to 1 from a value already contained therein.

In a block 1310, a determination is performed, where the determination involves determining a look-up table for concrete pan, tilt, zoom values and the distortion elimination factor value.

In a block 1312, a gradual dewarping is performed, where the gradual dewarping involves a non-linear transformation of an output image based on the look-up table. The output image may be rectilinear if the distortion elimination factor value is 1. If the distortion elimination factor value is less than 1, then the output image has distortion removed partially therefrom (partial distortion elimination).

Figure 14:
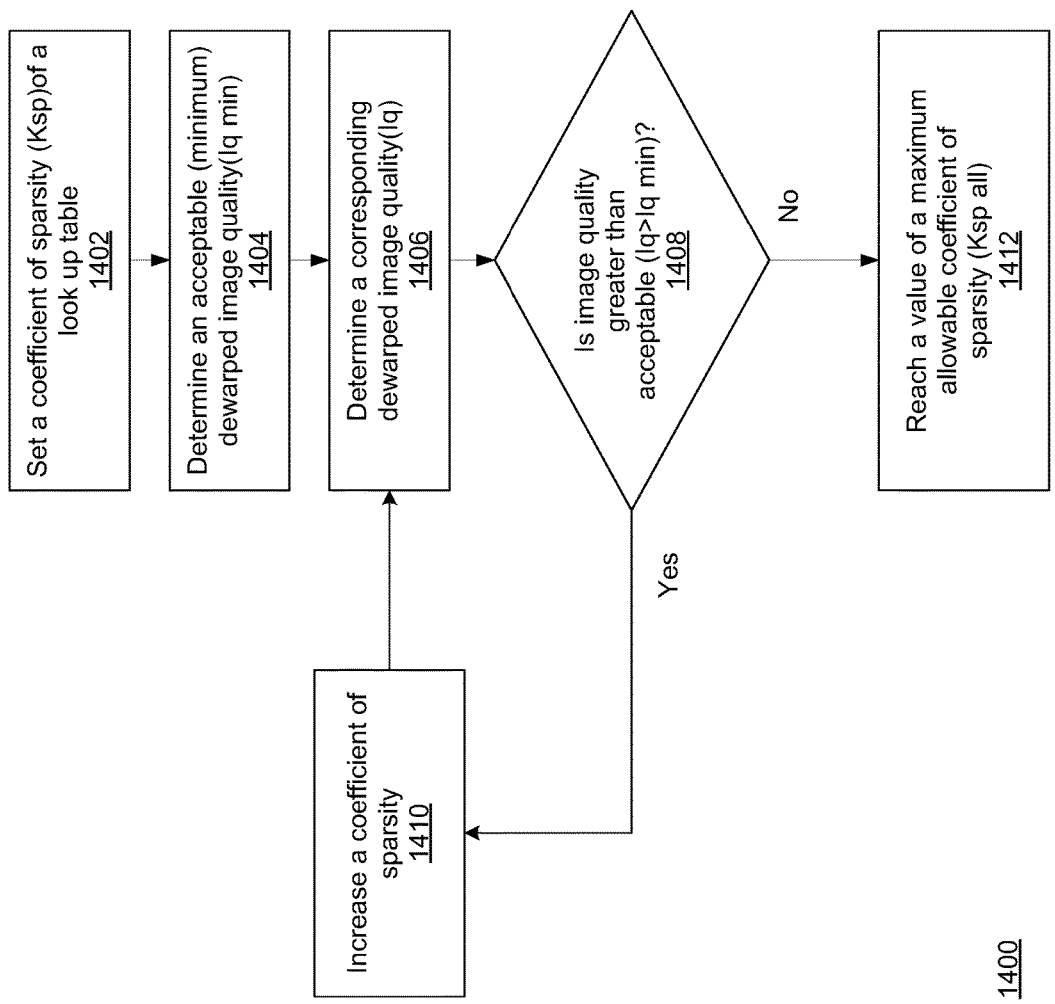
FIG. 14 shows a flowchart of a method of determining a maximum allowable coefficient of sparsity $K_{max}$ according to the present disclosure.
Figure 15:
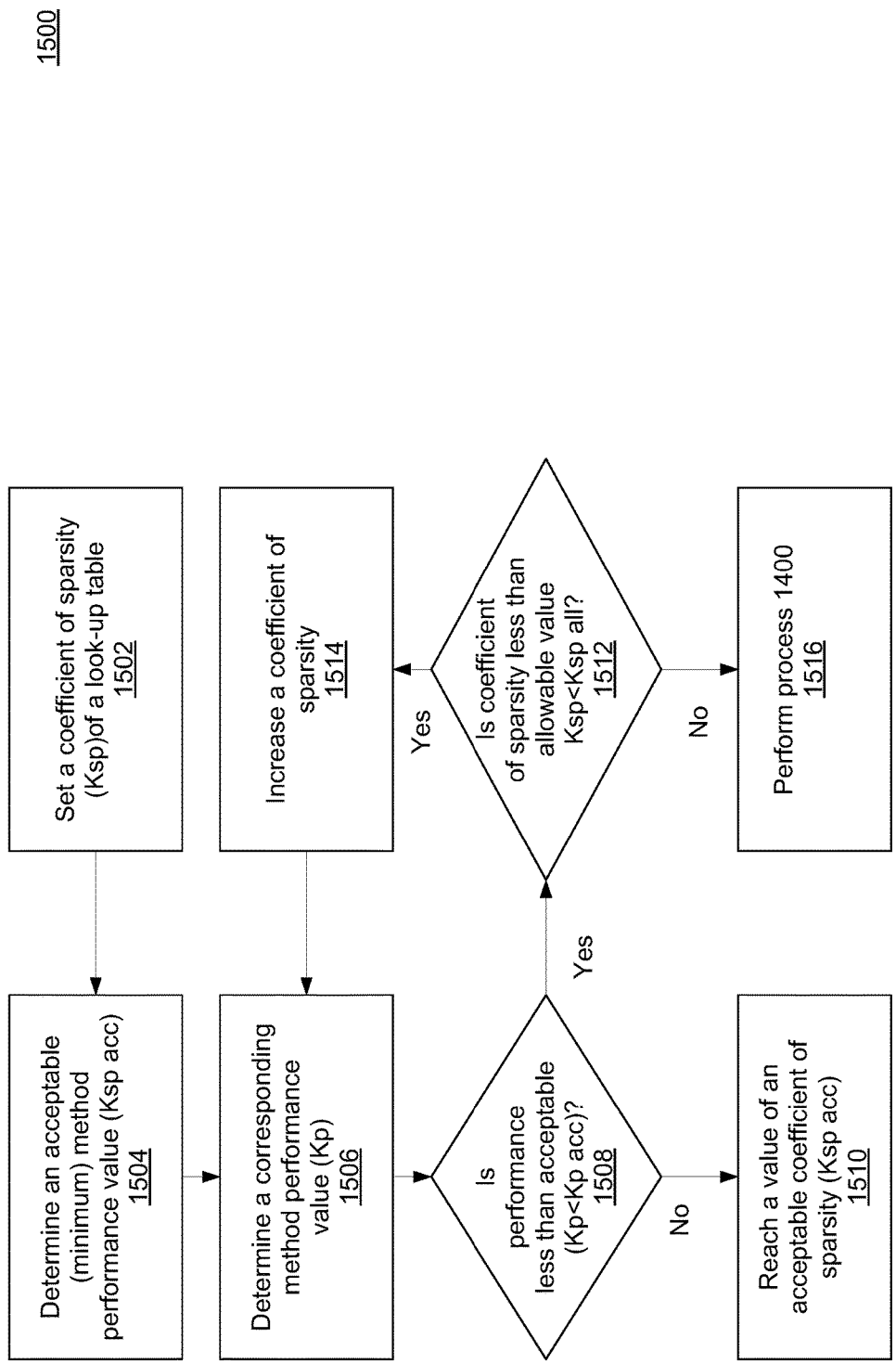
FIG. 15 shows a flowchart of a method of determining a coefficient of sparsity value according to the present disclosure.

A methodology, as shown in FIGS. 14-15 and further described below, allows an achievement of a balance between a quality of an output dewarped-image (with specified resolution) and a performance of a method disclosed herein. A computationally intensive part of this method is to determine a transformation map (look-up table). Therefore, the performance of this method may depend on such determination. Other determinations, such as an interpolation of a sparse map or a nonlinear transformation based on a full transformation map, can be implemented via various hardware, such as a processor. Consequently, this method provides a real-time performance, which is improved through a use of sparsed transformation map based on a coeffiecient of sparsity (factor). For example, upon a desire to obtain a dewarped image with a resolution of 2592×1944=5,038,848 pixels, that is 1944 lines in each of which there are 2,592 pixels, a transformation map (conversion) is created. If this transformation map is created with a value of the sparsity coefficient being 1, then a size of this transformation map is 2592×1944. In this case, a computer needs to execute the process 800A, such as the blocks 802-814, as disclosed herein, 5,038,848 times (each time corresponds to each pixel). Note that the process 800A is used by a computer to enable a conversion of a plurality of coordinates of a pixel of an output image into a plurality of coordinates of a pixel in an original image captured via a camera comprising a wide-angle camera lens. Likewise, if this transformation map is created with a value of the sparsity coefficient being 2, then a size of this transformation map is 1296×972=1, 259,712 pixels, which is 4 times less than in the previous case (factor of 1). Some studies show that increasing a coefficient of sparsity in some ranges results in a loss of image quality that is negligible. However, in some embodiments, a coefficient of sparsity may not be increased indefinitely because at some point an image quality becomes unacceptable to a user or a machine. Therefore, this method determines a sparsity coefficient of a transformation map based on seeking a balance between a quality of an output dewarped-image (with specified resolution) and a performance of this method. Note that finding an appropriate balance between two parameters is a multi-criteria task and can be performed on a basis of one of many methods of optimization. For example, such balance can be found based on a solution of a grid of values (value mesh) or based on a fixation of one parameter and an optimization for another parameter or others (any suitable method of multi-criteria optimization).

As further described below, a process allows a determination of a sparsity coefficient, which provides a balance between an image quality and a performance of the method. This process may be segmented into two phases or more, although a single phase is possible as well. FIG. 14 shows a first phase and FIG. 15 shows a second phase. FIG. 14 shows a flowchart of a method of determining a maximum allowable coefficient of sparsity $K_{sp}$ all according to the present disclosure. A process 1400 includes a plurality of blocks 1402-1412. The process 1400 is performed via any computer architectures, as disclosed herein, such as at least one of the topology 100, 200, 300, 400, 500, or 600. In some embodiments, the process 1400 is distributed over a plurality of computers or topologies, as disclosed herein. The process 1400 enables a determination of a maximum allowable coefficient of sparsity of a transformation map.

In a block 1402, a setting is performed, where the setting involves setting a coefficient of sparsity (Ksp) of a look-up table, such as via one or more pages of a graphical user interface, as disclosed herein, or via a sound input through a microphone or via a touch display gesture or an image input via a camera.

In a block 1404, a computer determines an acceptable (minimum) dewarped image quality (Iq min), such as via an input by a user, such as via a graphical user interface or other input methods disclosed herein, where the input is indicative whether an image quality is acceptable to the user or alternatively, whether the image quality meets a set of predetermined image quality criteria, such as brightness, contrast, color, or others.

In a block 1406, a computer determines a corresponding dewarped image quality (Iq), such as via an input by a user, such as via a graphical user interface or other input methods disclosed herein.

In a block 1408, a computer determines if an image quality (Iq) is greater than acceptable, such as via an input by a user, such as via a graphical user interface or other input methods disclosed herein. The computer performs such determination via determining if a value of the corresponding dewarped image quality (Iq) is greater than a value of the acceptable (minimum) dewarped image quality (Iq min). If yes, then a block 1410 is performed, otherwise a block 1412 is performed.

In a block 1410, a coefficient of sparsity is increased by a computer, automatically in response to the input indicative of the image quality being acceptable. Then, the block 1406 is performed.

In a block 1412, a maximum allowable coefficient of sparsity value (Ksp acc) is reached. Accordingly, in the process 1400, the user specifies the maximum allowable coefficient of sparsity Ksp acc, in which the image quality is still acceptable to the user. Such processing enables the user to gradually increase a value of the sparsity coefficient as long as the image quality is still satisfactory to the user. For example, an input is received, where a user provides an input, such as via a graphical user interface or other input methods disclosed herein, where the input is indicative whether an image quality is acceptable to the user or alternatively, whether the image quality meets a set of predetermined image quality criteria, such as brightness, contrast, color, or others. If the image quality is acceptable, then the process 1400 continues to a block 1406, otherwise to a block 1408.

FIG. 15 shows a flowchart of a method of determining a coefficient of sparsity value according to the present disclosure. A process 1500 includes a plurality of blocks 1502-1516. The process 1500 is performed via any computer architectures, as disclosed herein, such as at least one of the topology 100, 200, 300, 400, 500, or 600. In some embodiments, the process 1500 is distributed over a plurality of computers or topologies, as disclosed herein. The process 1500 enables a determination of a coefficient of sparsity of a transformation map.

In a block 1502, a setting is performed, where the setting involves setting a coefficient of sparsity (Ksp) of a look-up table, such as via one or more pages of a graphical user interface, as disclosed herein, or via a sound input through a microphone or via a touch display gesture or an image input via a camera.

In a block 1504, a computer determines an acceptable (minimum) method performance value (Kp acc), such as via an input by a user, such as via a graphical user interface or other input methods disclosed herein, where the input is indicative of a level of method speed, such as fast, intermediate, or slow, or whether a conversion performance is acceptable to the user or alternatively, whether the conversion performance meets a set of predetermined performance criteria, such as speed, memory use, system responsiveness, or others.

In a block 1506, a computer determines a corresponding method performance value (Kp), such as via an input by a user, such as via a graphical user interface or other input methods disclosed herein, where the input is indicative of a level of method speed, such as fast, intermediate, or slow.

In a block 1508, a computer determines if performance is less than acceptable, such as via an input by a user, such as via a graphical user interface or other input methods disclosed herein. The computer performs such determination via determining if the corresponding method performance value is less than the acceptable method performance value. If not, then a block 1510 is performed. If yes, then a block 1512 is performed.

In a block 1510, a value of an acceptable coefficient of sparsity (Ksp acc) providing an acceptable performance is reached.

In a block 1512, a computer checks whether the value of the coefficient of sparsity ($K_{sp}$) is less than the maximum possible value of the coefficient of sparsity ($k_{sp\ all}$). If so, then there is a transition or switch into the 1514, in which an increase in the coefficient of sparsity occurs, otherwise a block 1516 is performed. Note that the value $k_{sp}$ all in the block 1512 is determined as a result of a process shown in FIG. 14 and illustrated in FIG. 18.

Figure 19:
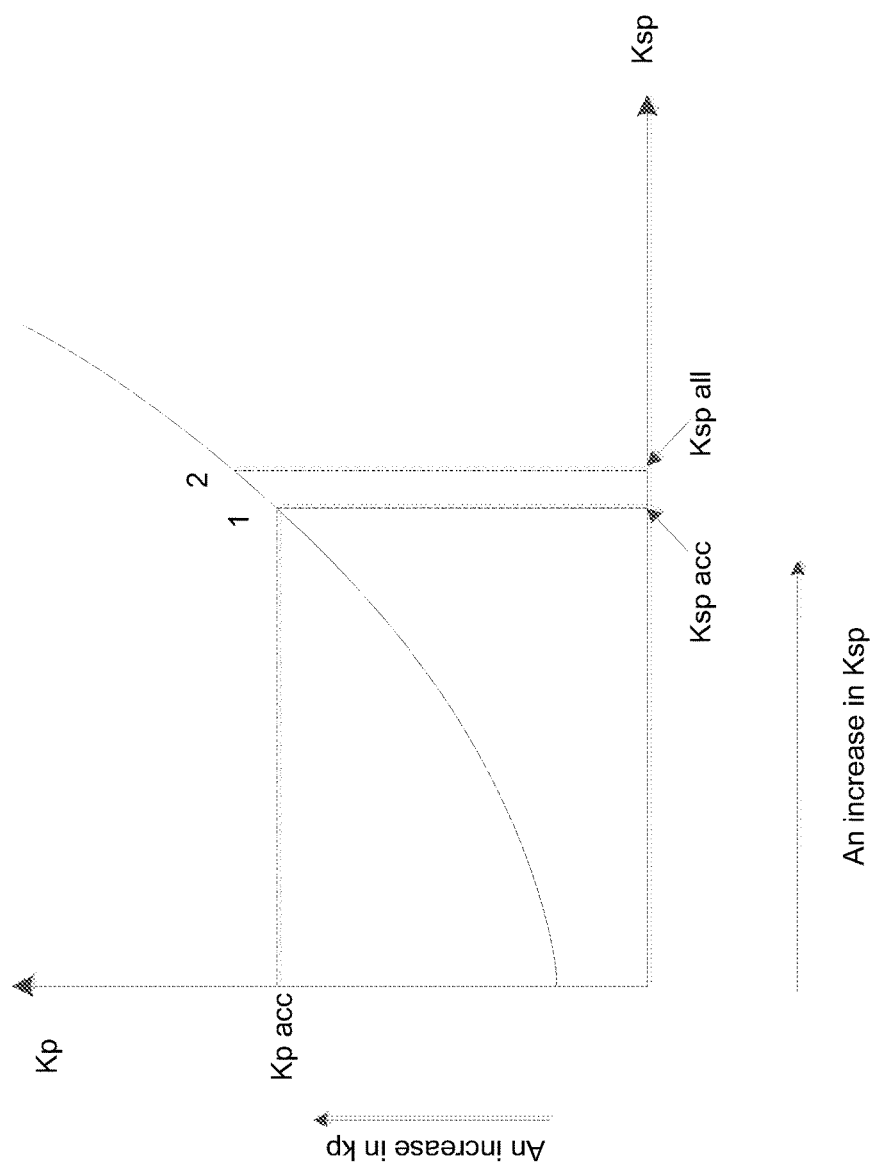
Figure 21:
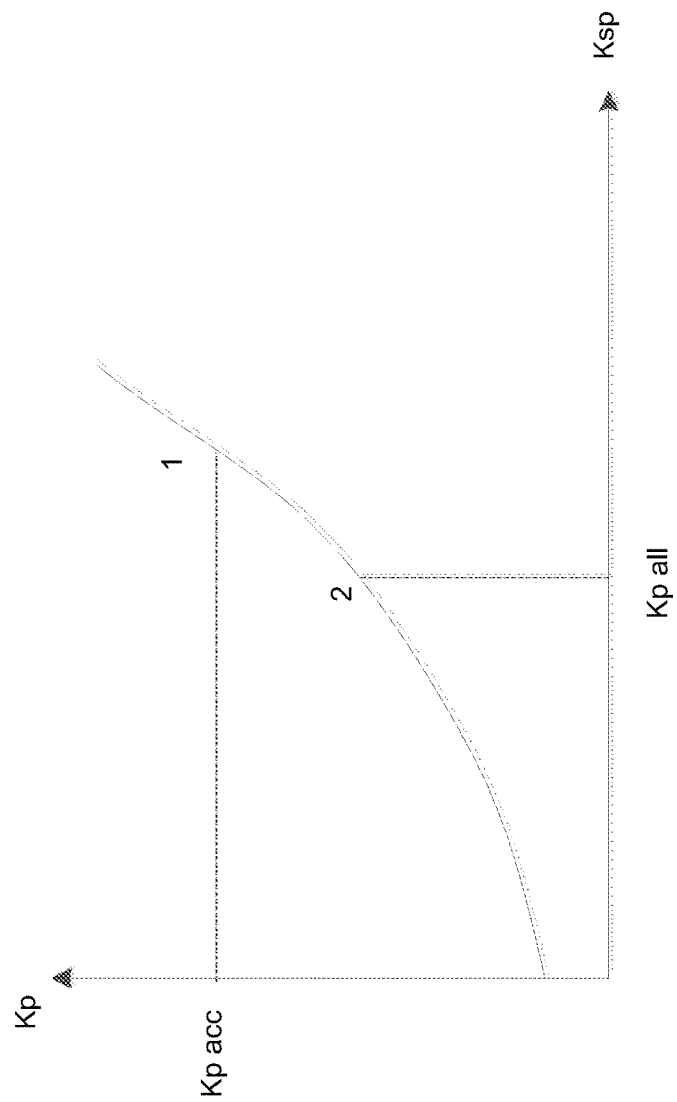

A process of FIG. 15 is illustrates in FIGS. 19 and 21. As $k_{sp}$ is increased, which via a horizontal arrow, there is a movement along a curve illustrated in FIG. 19. During such increase, there is also an increase in a performance value $k_p$. Note that an objective of such action is to achieve or reach a value acceptable performance $k_{sp\ acc}$, but the value of the coefficient of sparsity should, in some embodiments, not be more than the allowable value of $k_{sp\ all}$. FIG. 19 illustrates a situation when this goal has been achieved or reached. Moving along the curve depicted in FIG. 19 in a direction shown by the horizontal arrow, the point 1 can be reached, where the value of method performance is acceptable $k_{p\ acc}$, and the value of the coefficient of sparsity $k_{sp\ acc}$ is less than the maximum possible value of $k_{sp\ all}$. This situation is possible if the point 2 is rightward of the point 1 (as shown in FIG. 19). In a situation shown in FIG. 19, an output or exit of the block 1512 usually occurs along a branch "Yes." Note that FIG. 21 shows another situation where the point 2 is leftward of the point 1. Then, moving along the curve shown in FIG. 21, at some point, the $k_{sp}$ value reaches the value of $k_{sp\ all}$ (this happens at the point 2), but the value of $k_p$ will not yet reach the value of $k_{p\ acc}$ (the point 1). At that time, the output of the block 1512 is going to occur along a branch "No." In this case, it is recommended to return (the block 1516) to the stage of determining $k_{sp\ all}$, shown in FIG. 14, and determine a different value $k_{sp\ all}$, with which is possible to reach a compromise between image quality and performance of the method.

In a block 1514, a coefficient of sparsity is increased by a computer, automatically in response determining that a current coefficient of sparsity is less than a maximum allowable coefficient of sparsity.

In a block 1516, a computer begins performance of method 1400, such as from the block 1402. Accordingly, in the process 1500, the user defines a value of a coefficient of sparsity to ensure acceptable conversion performance. Such defining includes the user gradually increasing a value of a coefficient of sparsity (ranging from a minimum value equal to 1 to a maximum of Kmax) until conversion performance is not be acceptable to the user or does not meet predefined criteria, as stored in memory. Then, the value of the coefficient of sparsity is used to obtain a dewarped image.

FIGS. 16-21 show a set of two-dimensional graphs depicting various relationships between various values used in an image conversion process according to the present disclosure.

Figure 16:
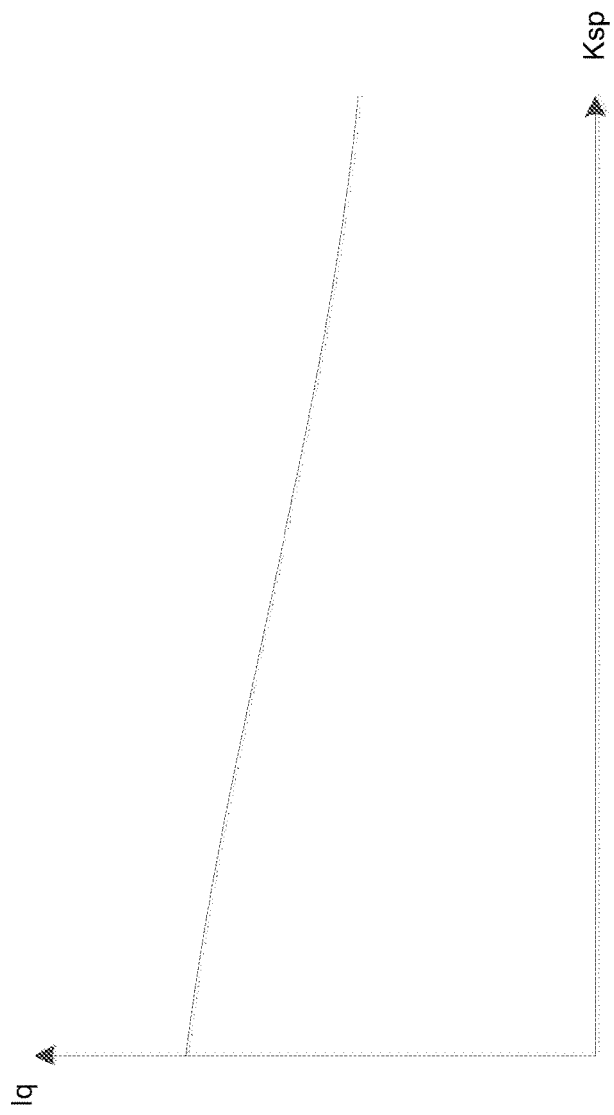
FIGS. 16-21 show a set of two-dimensional graphs depicting various relationships between various values used in an image conversion process according to the present disclosure.

FIG. 16 shows a relationship between a quality of an output image and a coefficient of sparsity. A horizontal axis lists a set of values of a coefficient of sparsity and a vertical axis lists a set of values associated with an image quality. The image quality may be determined, such as based on usage of various characteristics, such as a peak signal-to-noise or an average/mean squared error. At a minimum value of the coefficient of sparsity (k_sp=1), a value of the image quality (I_q) will be maximum. Upon an increase of a value of the coefficient of sparsity, then the image quality deteriorates.

Figure 17:

FIG. 17 shows a relationship of a coefficient of method performance (K_p) with a coefficient of sparsity K_sp. A horizontal axis lists a set of values of the coefficient of sparsity K_sp and a vertical axis lists a set of values of the coefficient of method performance (K_p). At a minimum value of the coefficient of sparsity (k_sp=1), a value of the coefficient of method performance (K_p) is minimal. Upon an increase of a value of the coefficient of sparsity, a value of the coefficient of method performance (K_p) increases along with method performance. For an estimation of a value of the coefficient method performance a formula can be used, where K_p=t_k/t_max, where K_p is a value of the coefficient of method performance, where t_k is a time desired to convert a single frame at a certain value of the coefficient of sparsity, where t_max is a maximum time period for conversion of the single frame (this value is appropriate at the minimum value of the coefficient of sparsity k_sp=1).

Figure 18:
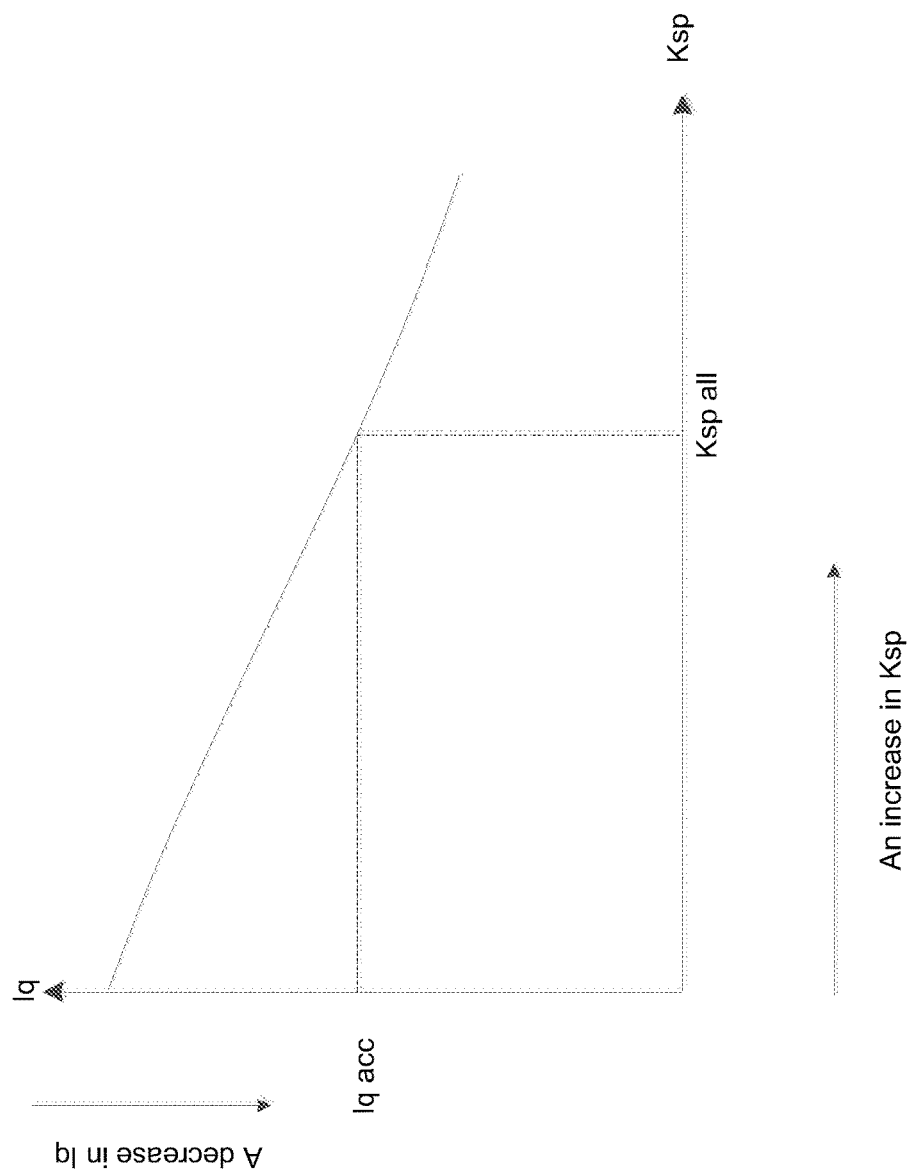

Various relationships and dependencies shown in FIGS. 16 and 17 are known qualitatively, i.e., a characteristic of dependency is known, but an exact nature of dependence in each case is unknown. Therefore, a procedure is desired in order to find a value of the coefficient of sparsity k_sp, that allows a satisfaction of multiple criteria simultaneously. Generally, this procedure is an optimization procedure according to multiple criteria. One possible approach to a solution of such criteria is a phased approach where a first stage is shown in FIG. 18 and a second stage shown in FIG. 19. Together, FIGS. 18 and 19 show a situation when, as shown in FIG. 15, a possibility exists to determine an acceptable value $k_{sp\ acc}$, i.e., in FIG. 15, a possibility exists to reach the block 1510.

As shown in FIG. 18, in the first stage, as shown by a horizontal arrow, the value of the coefficient of sparsity (k_sp) is gradually increased, starting from the minimum k_sp=1. Upon such increase, the value of the image quality decreases, which is shown by a vertical arrow. Such processing continues as long as the value of the image quality remains above an acceptable minimum value of the quality of the image (I_q acc). Upon completion of such processing, a maximum possible value of the coefficient of sparsity (k_sp all) is received, in which the value of the image quality is not lower or worse (I_q acc). This is also shown in FIG. 14.

As shown in FIG. 19, in the second stage, as shown by a horizontal arrow, the value of coefficient of sparsity k_sp gradually increases (as in the first stage), starting from a minimum value of the coefficient of sparsity k_sp=1. During this increase, the coefficient of method performance increases, which is shown by a vertical arrow. Such processing continues as long as the coefficient of method performance remains below an acceptable values of (k_p acc). Upon completion of such processing, an acceptable value of the coefficient of sparsity (k_sp acc) is received, which will be used to enforce that a performance of the method should be not less than the acceptable value $k_{p\ acc}$. This is also shown in FIG. 15. Note that in FIG. 19 (in performance of the method graphic) is shown the point 1, in which performance $k_{p\ acc}$ is achieved, while the value of the coefficient of sparsity $k_{sp\ acc}$ does not exceed values of $k_{sp\ all}$. This situation is possible if, as shown in FIG. 19, the point 2 is to rightward of the point 1 in the performance of the method graphic. In such situation, the output or exit of the block 1512 (FIG. 15) is usually done at a branch "Yes."

Figure 20:
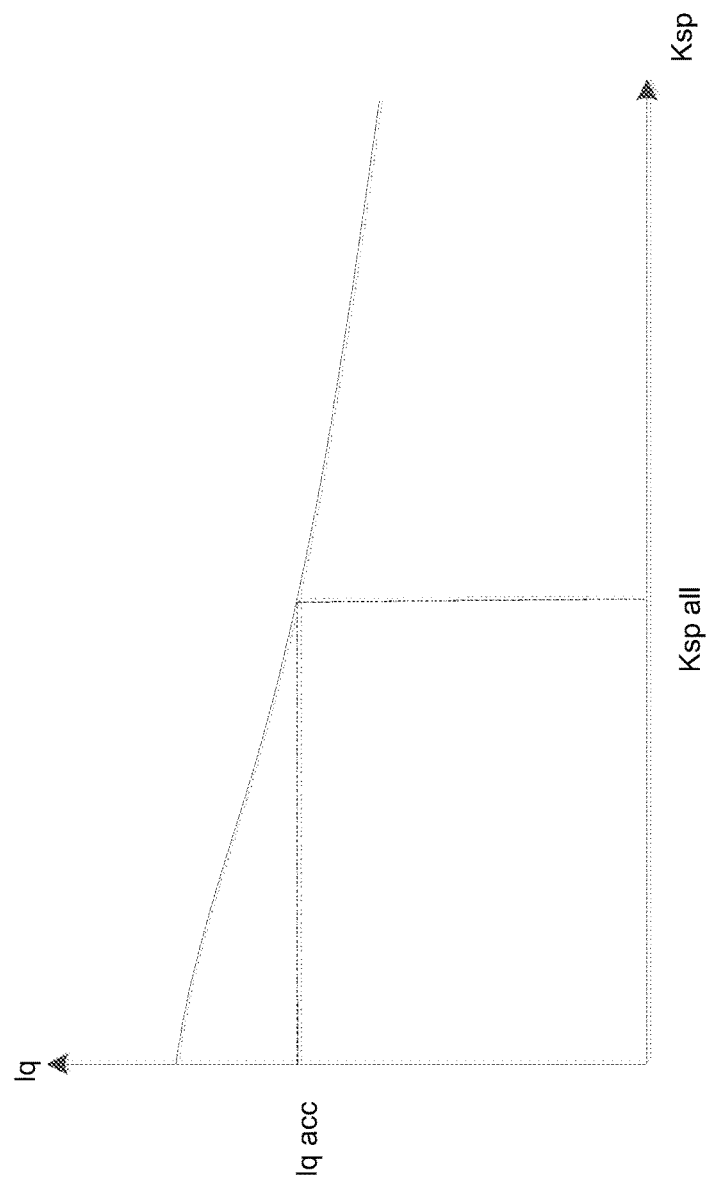

The phase approach described above, as shown in FIGS. 18 and 19, enables a receipt of an acceptable value of the coefficient of sparsity (k_sp acc), which runs simultaneously for various criteria: image quality and method performance. In such instance, in order to satisfy both criteria, a point 2 of FIG. 19 should be positioned on a right side of a point 1. However, a scenario is feasible when a point 2 of FIG. 19 is positioned to a left side of point 1. This scenario is shown in FIG. 21, a recommendation is made to return to the first stage, and to change (reduce) the value of the acceptable minimum value of the quality of the image (I_q acc) so that the value of the coefficient of sparsity (k_sp all) is shifted to the right side, and the point 2 moves to the right side of point 1. Together, FIGS. 20 and 21, show a situation when, as shown in FIG. 15, a low likelihood, or sometimes even an impossibility, exists to determine an acceptable value $k_{sp\ acc}$, i.e., in FIG. 15, there is a low likelihood, or sometimes even an impossibility, to arrive at the block 1510, and at some point during the process 1500, there is a switch or transition to the block 1516 and then a switch or transition to the process 1400 shown in FIG. 14. This may occur because the value $k_{sp\ acc}$, as shown in FIG. 20, is selected such that the point 2 on FIG. 21 is positioned leftward of the point 1. In a scenario shown in FIG. 21, in a process shown in FIG. 15, at some point, from the block 1512, there is an output or exit along a branch "No" into the block 1516.

Note that any method of converting an image acquired via a wide-angle camera, as disclosed herein, can be implemented on any computing device, including a mobile device, such as a tablet. Such computing device can be connected via a communication channel, for example Wi-Fi, with a wide-angle camera mounted, for example, in a land vehicle, on an aerial vehicle (including unmanned), within a vehicle, inside a room, on a wall/ceiling of a building, or the wide-angle camera may be installed so as to scan a bottom of a land vehicle or a railcar or any other structure. A user of the mobile device or another program/module on the mobile device can obtain images with corrected distortion for direct observation or further processing for various purposes, for example, an evaluation of a technical state, a detection of an explosive device, a detection of an intrusion, a fire/smoke/flood safety and so on. Also, note that any method of converting an image acquired via a wide-angle camera, as disclosed herein, can be implemented on any computing device that can be embedded in a wide-angle camera. Further, the wide-angle camera can be used to review hard to reach places, for example, in a system to scan a bottom of automobile, buses, vans, trucks, and railcars, in medical system, and so on.

In some embodiments, a method of image conversion, as disclosed herein, can be implemented on a mobile device, such as a tablet, which is connected via a data communication channel, whether wired or wireless, to a wide-angle camera, such as via Wi-Fi. The wide-angle camera can be configured/positioned to capture an image of a specific area. For example, the wide-angle camera can be installed indoors, outdoors, on a pole, a building, a vehicle, whether manned or unmanned, whether aerial, marine, space, or land, whether underground or aboveground, whether submerged or floating. A video feed is supplied to the mobile device, which runs an application on an operating system or an operating system. The application implements the method of image conversion, such as via dewarping a set of input images. A user of the mobile device or another program running on the mobile device changes a set of parameters of a virtual PTZ camera, such as via changing a pan setting, a tilt setting, or a zoom setting, analyzes a viewing area, and on-demand or if necessary, further processes the set of the input images. Although such processing can be directed to various purposes, some of such purposes may include, for example, an identification of a source of fire, smoke, or steam, a malfunction, an abnormal human behavior, a dangerous situation on or of transport, an abandoned object, an explosive device, or other purposes.

In some embodiments, a method of image conversion, as disclosed herein, can be implemented on a computing device, including a device built-in or embedded into a wide-angle camera. The computing device is connected with the wide-angle camera via a data communication channel, whether wired or wireless. The wide-angle camera can be configured/positioned to capture an image of a specific area. For example, the wide-angle camera can be installed indoors, outdoors, on a pole, a building, a vehicle, whether manned or unmanned, whether aerial, marine, space, or land, whether underground or aboveground, whether submerged or floating. For example, the wide-angle camera can be installed on a level of a roadway or to a telescopic tube for a review of land vehicle from below. For example, the wide-angle camera may be installed on an end portion of a flexible probe for observation of hard to reach places/areas. For example, a miniature wide-angle camera can be mounted on an end portion of a flexible probe for a medical diagnosis inside a human body. For example, a video feed from the wide-angle camera can be sent to the computing device. The application implements the method of image conversion, such as via dewarping a set of input images. A user of the mobile device or another program running on the mobile device changes a set of parameters of a virtual PTZ camera, such as via changing a pan setting, a tilt setting, or a zoom setting, analyzes a viewing area, and on-demand or if necessary, further processes the set of the input images. Although such processing can be directed to various purposes, some of such purposes may include, for example, stitching of images, detection of abnormal situations, detection of dangerous objects, detection of diseases, or other purposes.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A device comprising:
    a camera containing a processor, a memory, and a wide-angle lens, wherein the processor is coupled to the memory, wherein the memory stores a file and a set of instructions, wherein the file contains a setting, wherein the set of instructions executably configures the processor to:
        access a first image captured via the wide-angle lens, wherein the first image includes a pixel;
        read the setting;
        determine a first set of coordinates of the pixel based on the setting and for each cell of a sparse conversion map;
        interpolating the first set of coordinates to obtain a second set of coordinates, wherein the second set of coordinates is associated with a second image,
        wherein the first image would be less rectilinear than the second image when the first image and the second image are displayed,
        wherein the second image is associated with the sparse conversion map corresponding to a sparse grid of pixels, and
        wherein the second image is associated with a full conversion map corresponding to a full grid of pixels with a plurality of cells; and
        output the second image.

2. The device of claim 1, wherein the sparse conversion map is represented as a look-up table.

3. The device of claim 1, wherein the second set of coordinates is represented as a look-up table.

4. The device of claim 1, wherein the setting includes an identifier informative of a position of the wide-angle lens to be at least one of a ceiling position, a wall position, or a floor position.

5. The device of claim 1, wherein the setting includes a first angle value and a second angle value.

6. The device of claim 5, wherein the first angle value is a minimum angle value associated with the camera and the second angle value is a maximum angle value associated with the camera.

7. The device of claim 1, wherein the setting includes a resolution of the second image in pixels.

8. The device of claim 1, wherein the set of instructions further executably configures the processor to: determine a distance to an image plane based on a zoom value and a normal vector of the image plane based on a pan value and a tilt value, wherein the setting includes at least one of the pan value or the tilt value, wherein the image plane in the file is based on the determining the distance and the normal vector, wherein the image plane is associated with at least one of the first image or the second image.

9. The device of claim 1, wherein determining the first set of coordinates comprises:
converting, by the processor, a coordinate associated with a cell of the sparse conversion map into a mathematical representation on an image plane; and
converting, by the processor, the mathematical representation into a set of 3D coordinates and then into a set of 2D coordinates, wherein the set of 3D coordinates and the set of 2D coordinates are from a coordinate system associated with the first image.

10. The device of claim 9, wherein determining the first set of coordinates further comprises:
converting, by the processor, the set of 2D coordinates associated with the first image into a set of pixel coordinates of the first image;
recording, by the processor, the set of pixel coordinates of the first image into the first look-up table.

11. The device of claim 1, wherein outputting further comprises:
requesting, by the processor, the second image to be sent to a server.

12. The device of claim 1, wherein outputting further comprises:
recording, by the processor, the second image onto the memory.

13. The device of claim 1, further comprising:
a platform supporting the camera, wherein the platform is configured such that a bottom of a vehicle is positioned before the camera when the vehicle drives over the platform.

14. The device of claim 13, wherein the set of instructions further executably configures the processor to access a third image captured via the wide-angle lens, wherein the first image, the second image, and the third image depict the bottom, wherein the second image and the third image are stitched to form a fourth image.

15. The device of claim 13, wherein the wide-lens is protected by a dome that is transparent.

16. The device of claim 13, wherein the platform supports a light source configured to operate with the camera.

17. The device of claim 16, wherein the camera and the light source are powered via a mains electricity source.

18. The device of claim 1, wherein the camera is a pantiltzoom (PTZ) camera.

19. The device of claim 18, wherein the camera is a virtual PTZ camera.

20. The device of claim 1, wherein the set of instructions further executably configures the processor to modify the second image other than dewarping before the outputting.

* * * * *